(12) United States Patent
Daniels

(10) Patent No.: US 10,107,359 B2
(45) Date of Patent: *Oct. 23, 2018

(54) CONVEYOR BELT FASTENER AND METHOD OF MANUFACTURE

(71) Applicant: Flexible Steel Lacing Company, Downers Grove, IL (US)

(72) Inventor: William J. Daniels, Orland Park, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,606

(22) Filed: Nov. 27, 2017

(65) Prior Publication Data

US 2018/0080526 A1    Mar. 22, 2018

Related U.S. Application Data

(63) Continuation of application No. 15/418,196, filed on Jan. 27, 2017, now Pat. No. 9,829,067, which is a
(Continued)

(51) Int. Cl.
*B65G 17/00* (2006.01)
*F16G 3/04* (2006.01)
(Continued)

(52) U.S. Cl.
CPC .................. *F16G 3/04* (2013.01); *B25C 5/06* (2013.01); *F16G 3/003* (2013.01); *F16G 3/16* (2013.01)

(58) Field of Classification Search
None
See application file for complete search history.

(56) References Cited

U.S. PATENT DOCUMENTS

| | | |
|---|---|---|
| 2,477,855 A | 8/1949 | Beach |
| 3,327,358 A | 6/1967 | Schick |
| (Continued) | | |

FOREIGN PATENT DOCUMENTS

| | | |
|---|---|---|
| AU | 125500 | 7/1947 |
| CN | 2199365 Y | 5/1995 |
| (Continued) | | |

OTHER PUBLICATIONS

Charter Wire, Charter Wire brochure, publicly available more than one year before Aug. 18, 2014, 5 pages.
(Continued)

*Primary Examiner* — William R Harp
(74) *Attorney, Agent, or Firm* — Fitch, Even, Tabin & Flannery LLP

(57) ABSTRACT

In one aspect, a conveyor belt fastener is provided having a rigid body made from a strip of cold-rolled or cold-drawn material such as steel. The body has an upper plate portion, a lower plate portion, and loop portions connecting the upper and lower plate portions. The upper and lower plate portions each have a variable cross-sectional thickness laterally thereacross including raised walls projecting outwardly and ribs projecting inwardly. The fastener has at least one attachment member, such as a staple, for connecting the plate portions to a conveyor belt end and the raised walls protect the staple once driven into the conveyor belt end.

20 Claims, 29 Drawing Sheets

Related U.S. Application Data continuation of application No. 14/825,606, filed on Aug. 13, 2015, now Pat. No. 9,556,930.

(60) Provisional application No. 62/038,669, filed on Aug. 18, 2014.

(51) Int. Cl.
  *B25C 5/06* (2006.01)
  *F16G 3/16* (2006.01)
  *F16G 3/00* (2006.01)

(56) References Cited

U.S. PATENT DOCUMENTS

| | | | | |
|---|---|---|---|---|
| 3,368,417 A * | 2/1968 | Jenkins | F16G 1/22 | 24/33 P |
| 3,962,754 A * | 6/1976 | Stolz | F16G 3/04 | 24/33 B |
| 4,023,239 A * | 5/1977 | Stolz | F16G 3/02 | 24/33 P |
| 4,050,138 A * | 9/1977 | Stolz | F16G 3/003 | 227/155 |
| 4,060,877 A * | 12/1977 | Schick | F16G 3/04 | 24/33 B |
| 4,144,628 A * | 3/1979 | Schick | B27F 7/19 | 227/119 |
| 4,151,634 A | 5/1979 | Stolz | | |
| 4,212,094 A * | 7/1980 | Pray | F16G 3/08 | 24/31 B |
| 4,315,349 A * | 2/1982 | Stolz | F16G 3/04 | 24/33 C |
| 4,333,217 A * | 6/1982 | Pray | B25B 31/00 | 227/152 |
| 4,538,755 A * | 9/1985 | Schick | F16G 3/16 | 227/147 |
| 4,582,505 A | 4/1986 | Stolz | | |
| 4,620,657 A * | 11/1986 | Gladding | B21J 15/14 | 227/147 |
| 4,653,156 A * | 3/1987 | Stolz | F16G 3/04 | 24/31 B |
| 4,671,403 A * | 6/1987 | Schick | F16G 3/02 | 198/844.2 |
| 4,688,711 A * | 8/1987 | Gladding | B21J 15/14 | 227/147 |
| 4,858,280 A * | 8/1989 | Schick | F16G 3/02 | 24/33 B |
| 4,937,921 A * | 7/1990 | Musil | F16G 3/04 | 24/33 C |
| 4,942,645 A * | 7/1990 | Musil | F16G 3/02 | 24/33 B |
| 4,996,750 A * | 3/1991 | Musil | F16G 3/02 | 24/33 B |
| 5,025,968 A * | 6/1991 | Nasiatka | B25C 1/008 | 227/31 |
| 5,095,590 A * | 3/1992 | Schick | F16G 3/04 | 198/844.2 |
| 5,170,924 A * | 12/1992 | Musil | F16G 3/16 | 227/111 |
| 5,182,933 A * | 2/1993 | Schick | B21D 35/00 | 24/33 B |
| 5,236,079 A * | 8/1993 | Herold | F16G 3/00 | 198/844.2 |
| 5,341,545 A | 8/1994 | Herold | | |
| 5,368,214 A * | 11/1994 | Schick | F16G 3/16 | 227/147 |
| 5,539,959 A * | 7/1996 | Schick | F16G 3/04 | 24/33 B |
| 5,544,801 A * | 8/1996 | Schick | F16G 3/04 | 227/110 |
| 5,553,359 A * | 9/1996 | Herold | F16G 3/04 | 24/33 P |
| 5,644,836 A * | 7/1997 | Schick | F16G 3/16 | 227/153 |
| 5,645,159 A * | 7/1997 | Luginbuhl | B22D 11/0605 | 198/834 |
| 5,669,114 A * | 9/1997 | Jakob | F16G 3/04 | 198/844.2 |
| 5,881,863 A | 3/1999 | Borner | | |
| 5,884,369 A * | 3/1999 | Schick | F16G 3/02 | 198/844.2 |
| 5,890,266 A * | 4/1999 | Herold | F16G 3/02 | 16/386 |
| 6,053,308 A * | 4/2000 | Vogrig | F16G 3/02 | 198/844.2 |
| 6,085,897 A * | 7/2000 | Schick | F16G 3/02 | 198/844.2 |
| 6,196,378 B1 * | 3/2001 | Borner | F16G 3/04 | 198/844.2 |
| 6,216,851 B1 * | 4/2001 | Mitas | F16G 3/02 | 198/844.2 |
| 6,311,393 B1 | 11/2001 | Gamer | | |
| D513,964 S | 1/2006 | Overthun | | |
| D539,291 S | 3/2007 | Li | | |
| D572,119 S | 7/2008 | Wells | | |
| 9,556,930 B2 * | 1/2017 | Daniels | | |
| 9,829,067 B2 * | 11/2017 | Daniels | F16G 3/04 | |
| 2002/0040841 A1 | 4/2002 | Winkelman | | |
| 2002/0139644 A1 * | 10/2002 | Herold | F16G 3/16 | 198/844.2 |
| 2010/0200374 A1 * | 8/2010 | Jakob | F16G 3/02 | 198/844.2 |
| 2012/0090965 A1 | 4/2012 | Jakob | | |
| 2012/0228170 A1 | 9/2012 | Richardson | | |
| 2013/0167356 A1 | 7/2013 | Hagie | | |
| 2013/0327112 A1 * | 12/2013 | Charre | B21B 31/103 | 72/237 |
| 2014/0182089 A1 * | 7/2014 | Jakob | F16G 3/02 | 24/33 B |
| 2016/0047438 A1 | 2/2016 | Daniels | | |

FOREIGN PATENT DOCUMENTS

| | | |
|---|---|---|
| CN | 2596103 Y | 12/2003 |
| CN | 201133441 Y | 10/2008 |
| CN | 201434047 Y | 3/2010 |
| CN | 101270795 B | 11/2010 |
| CN | 102116361 A | 7/2011 |
| CN | 205423686 | 8/2016 |
| CN | 206092811 | 4/2017 |
| DE | 4012877 A1 | 10/1991 |
| DE | 4431835 C1 | 2/1996 |
| FR | 571613 A | 2/1924 |
| GB | 1603544 A | 11/1981 |
| GB | 2146730 A | 4/1985 |
| GB | 2202605 A | 9/1988 |
| WO | 2012072274 A1 | 6/2012 |
| WO | 2012103961 A1 | 8/2012 |
| WO | 2016028586 | 2/2016 |

OTHER PUBLICATIONS

Charter Wire, Near Net Shapes brochure, publicly available more than one year before Aug. 18, 2014, 8 pages.
Clipper-MATO Belt Fastening Systems for Mining Operations, publicly available more than one year before Aug. 18, 2014, 6 pages.
GORO, Titan brochure, publicly available more than one year before Aug. 18, 2014, 6 pages.
GORO, Titan Conveyor Belt Fastening System, 1980, 5 pages.
GORO, Titan H brochure, publicly available more than one year before Aug. 18, 2014, 12 pages.
MATO Mining Service, MATO Hingeless Belt Fastening System, publicly available more than one year before Aug. 18, 2014, 4 pages.
MATO, Belt Lacing-Systems brochure, publicly available more than one year before Aug. 18, 2014, 20 pages.

(56) References Cited

OTHER PUBLICATIONS

MATO, Hammer System MH30, publicly available more than one year before Aug. 18, 2014, 6 pages.
MATO, Standard System S30 brochure, publicly available more than one year before Aug. 18, 2014, 4 pages.
ML T Fasteners, publicly available more than one year before Aug. 18, 2014, 4 pages.
Notification of Transmittal of the International Search Report and the Written Opinion of the International Searching Authority, or the Declaration from the International Bureau of WIPO for related International Application No. PCT/US15/44979, dated Nov. 13, 2015, 10 pages.
Scandura Mato, Belt Fasteners and Ancillary Conveyor Equipment brochure, publicly available more than one year before Aug. 18, 2014, 4 pages.
Design U.S. Appl. No. 29/626,966 titled Portion of a Fastener for a Conveyor Belt, filed Nov. 21, 2017, 17 pages.
Design U.S. Appl. No. 29/499,693, titled Portion of a Fastener for Conveyor Belts, filed Aug. 18, 2014, 29 pages.
Website, GORO, Record V6 and Operating procedure, publicly available more than one year before Aug. 18, 2014, 3 pages.
Website, GORO, Titan Staggered and Titan 05, publicly available more than one year before Aug. 18, 2014, 2 pages.
Extended European search report issued in related European Patent Application No. 15833143.9, dated Mar. 20, 2018, 8 pages.
SIPO; Chinese App. No. 201510509561.9; First Office Action dated Jul. 24, 2018; pp. 1-7.
Australian Patent Office; App. No. 2015305863; Examination report No. 1 for standard patent application dated Jul. 23, 2018; pp. 1-4.

\* cited by examiner

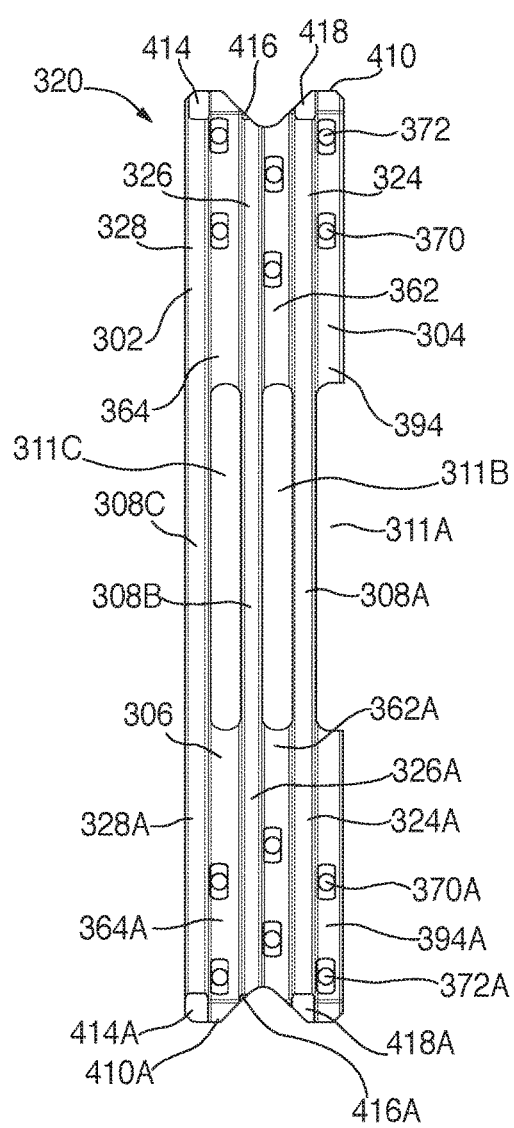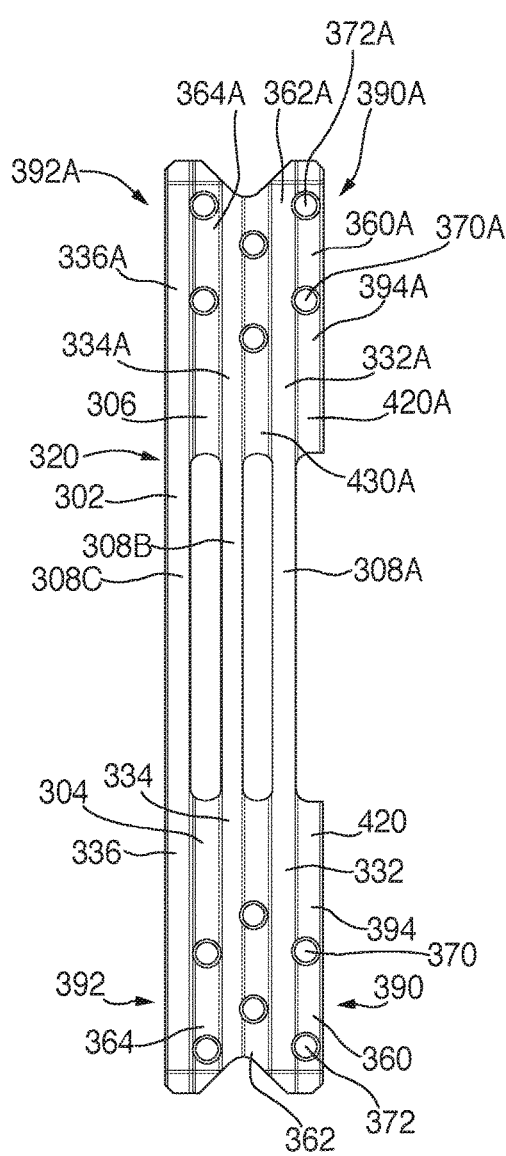
FIG. 19
FIG. 20

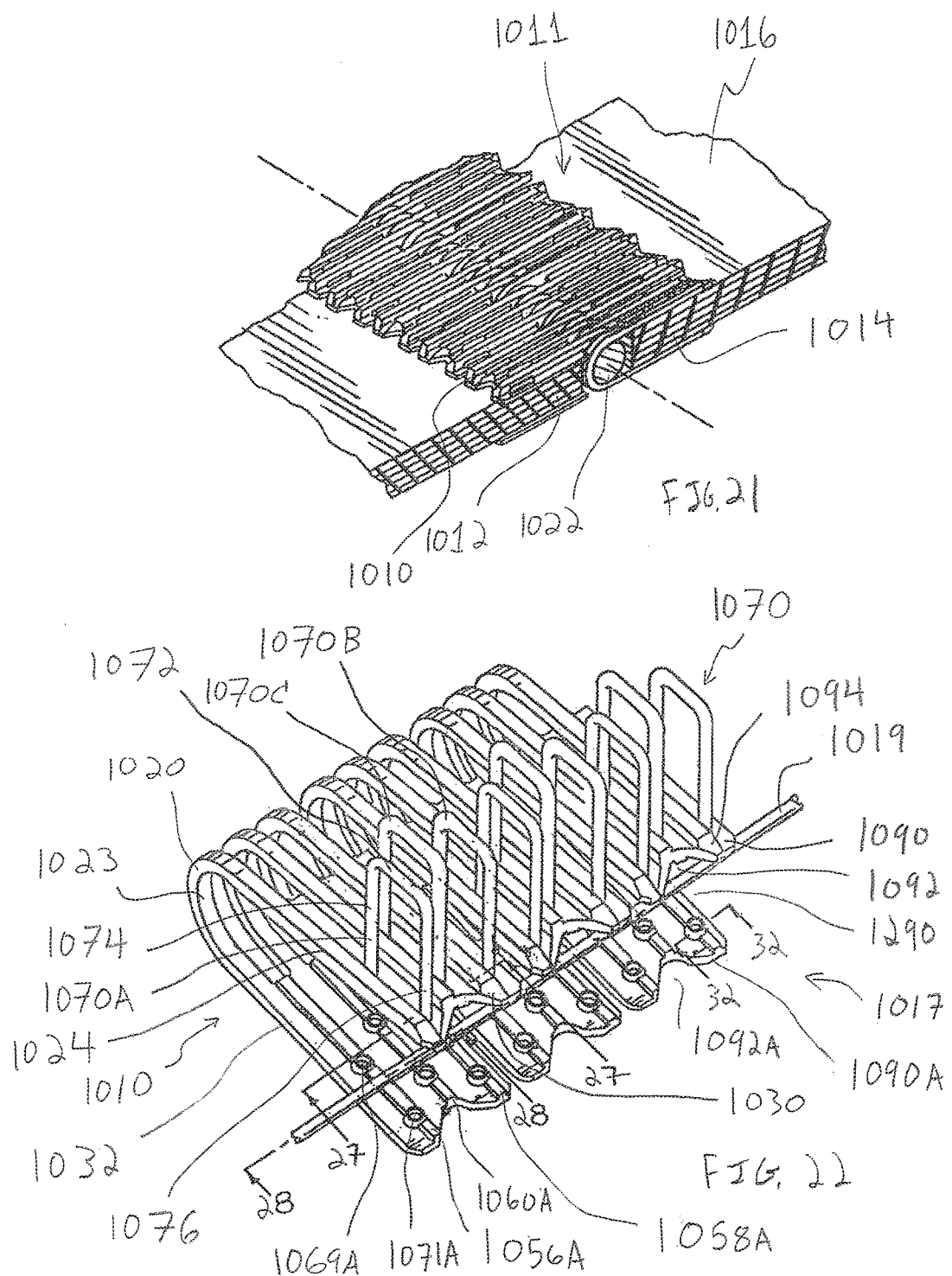

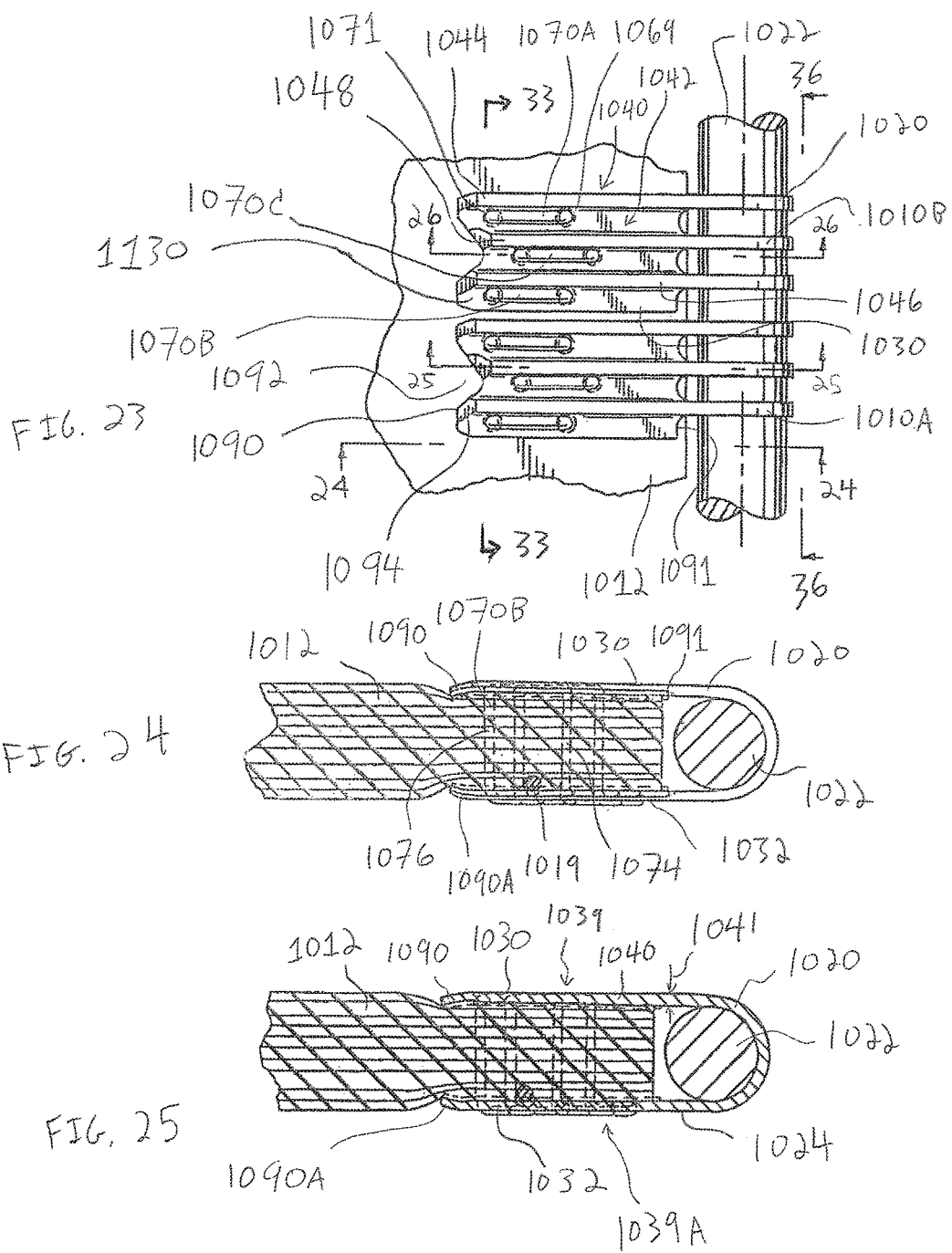

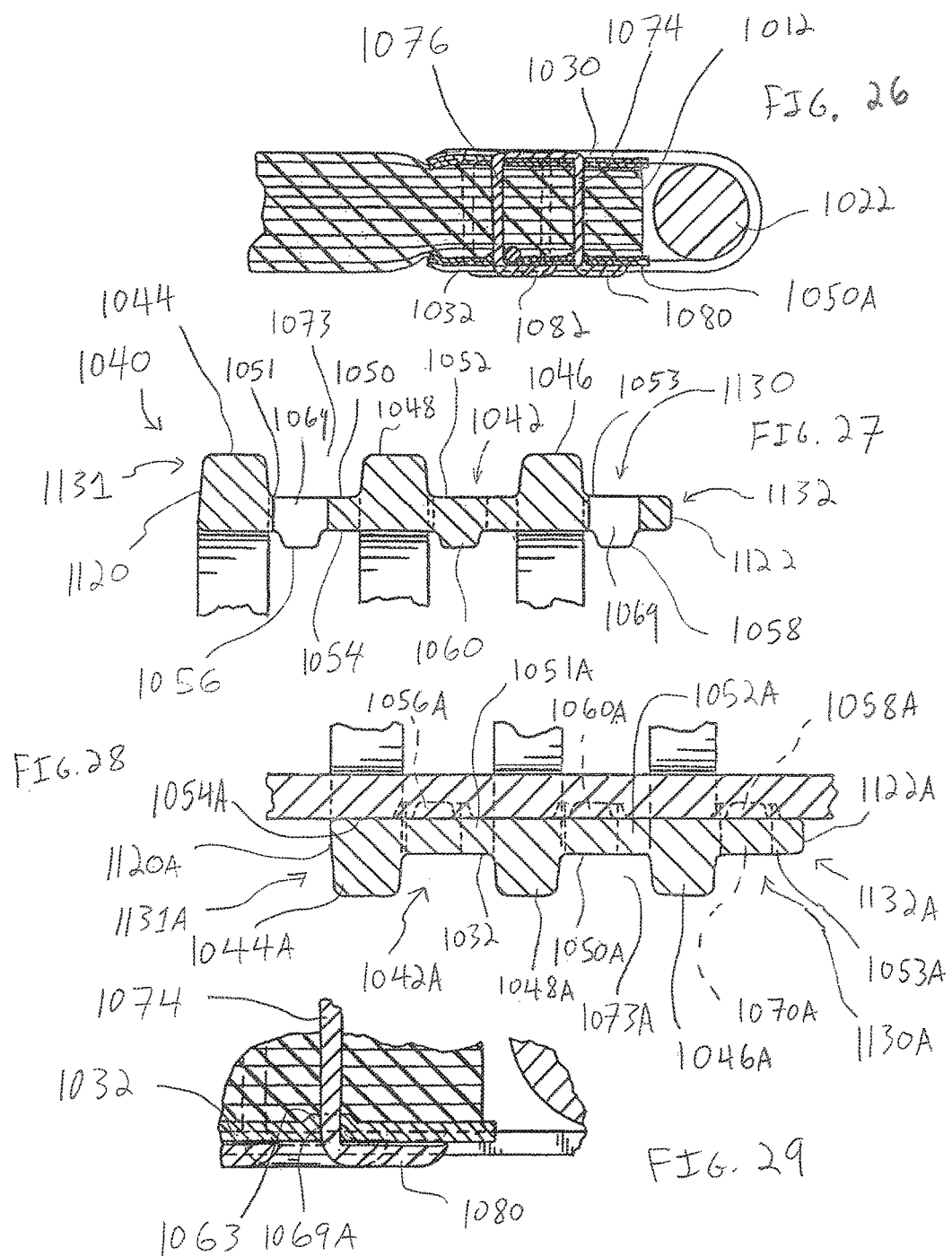

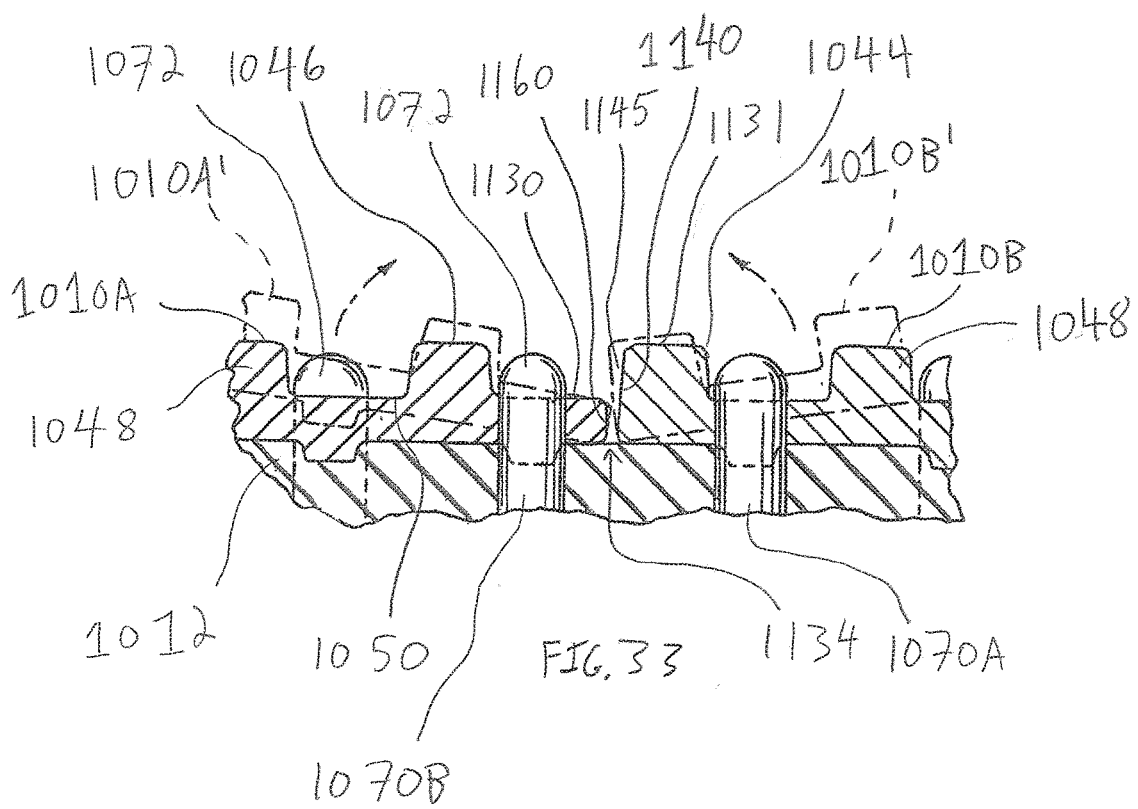

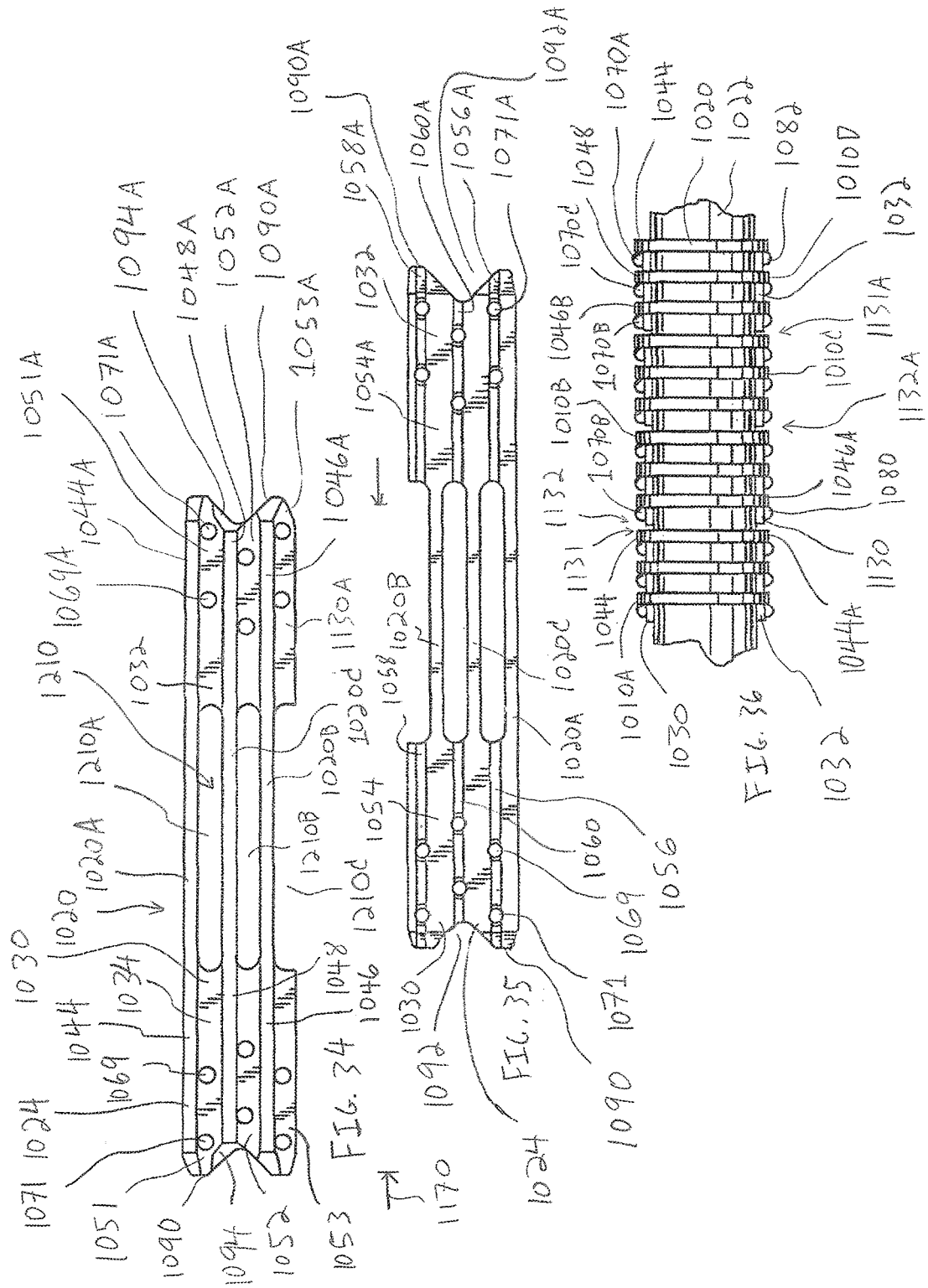

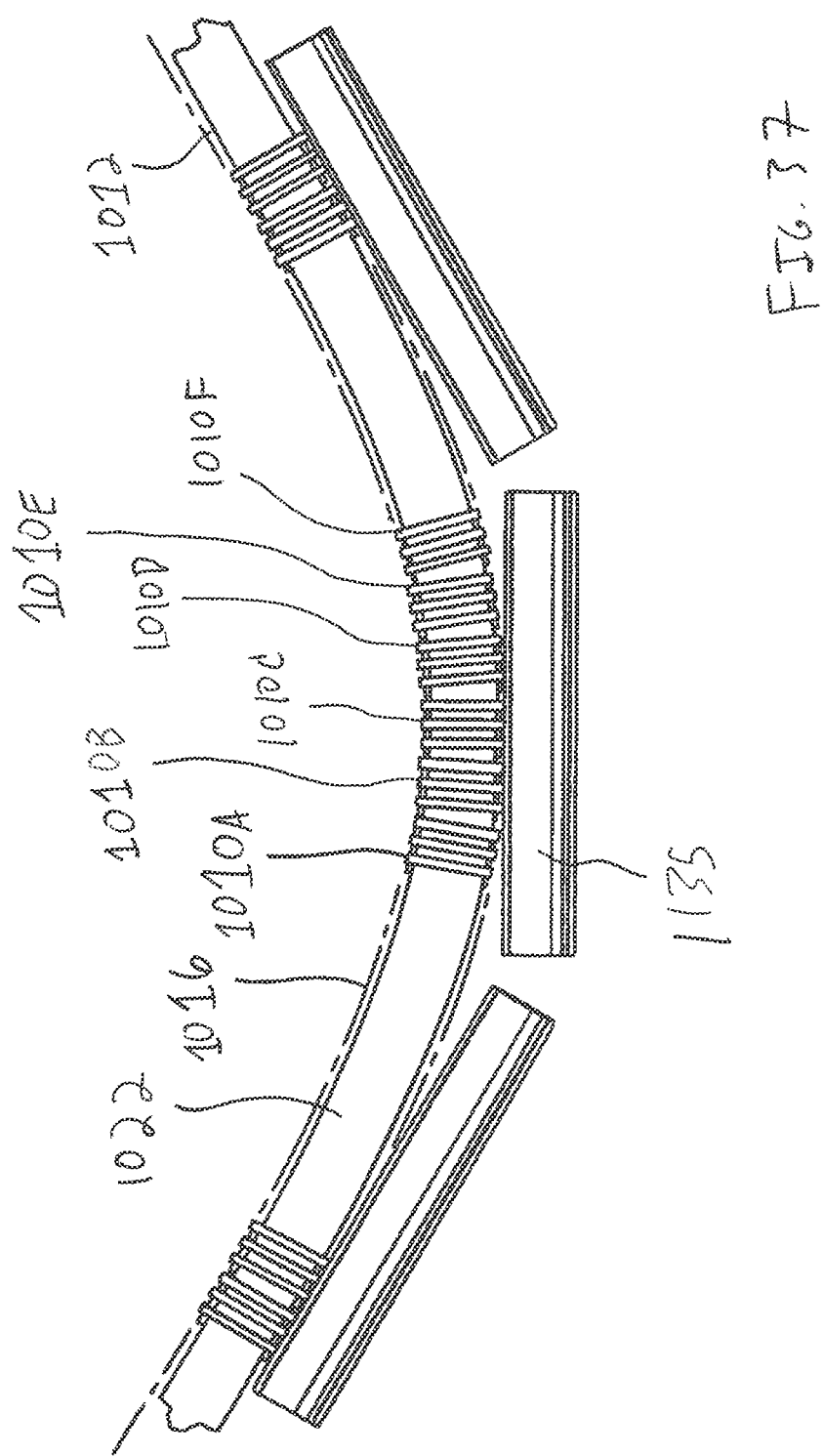

CONVEYOR BELT FASTENER AND METHOD OF MANUFACTURE

CROSS-REFERENCE TO RELATED APPLICATIONS

This application is a continuation of U.S. patent application Ser. No. 15/418,196, filed Jan. 27, 2017, which is a continuation of Ser. No. 14/825,606, filed Aug. 13, 2015, which issued as U.S. Pat. No. 9,556,930 on Jan. 31, 2017, which claims the benefit of U.S. Provisional Patent Application No. 62/038,669, filed Aug. 18, 2014, all which are hereby incorporated by reference in their entirety.

FIELD OF THE INVENTION

The invention relates to conveyor belt fasteners and manufacturing methods therefore and, more particularly, to conveyor belt fasteners that utilize staples, rivets, or other approaches for securing the fasteners to conveyor belts.

BACKGROUND OF THE INVENTION

Conveyor belts are used to transport materials or goods from one place to another. Conveyor belts are often provided in predetermined lengths that require belt fasteners to secure the two ends of the belt length together to form a continuous belt. Conveyor belt fasteners are also used to repair conveyor belts that become damaged such as by ripping or tearing during operation. The belt fasteners can be of the hinged-type and can be stapled, riveted, or otherwise secured to the belt ends and are thereafter joined together by a hinge pin.

U.S. Pat. No. 4,060,877 to Schick discloses one type of fastener having spaced arms for being secured to an end of a conveyor belt and a hinge knuckle connecting the arms. The fastener arms are secured to one end of a conveyor belt and the hinge knuckle interengages with hinge knuckles projecting from fastener arms secured to the other end of the conveyor belt. The hinge knuckles are coupled together by a hinge pin that is passed through openings formed by the interengaged hinge knuckles. The hinge knuckle of each fastener has a reduced width relative to the fastener arms to permit the interengagement between the hinge knuckles. The reduced width may reduce the strength of the fastener at the hinge knuckle where the fastener is subject to high loading forces as the conveyor belt and fastener thereon travel over pulleys or rollers of the conveyor belt system.

The '877 patent discloses that the fastener is fabricated from a piece of sheet metal having a width practically constant over its entire length. To form the hinge knuckle, the sides of the piece sheet metal are folded back against each other to reside in a plane substantially perpendicular to clamping tongues of the fastener. The '877 patent discloses that this process of folding back the sheet metal to form a U-shaped cross-section of the hinge knuckle strengthens the hinge knuckle. However, the step of folding back the sheet metal to form the u-shaped cross-section of the hinge-knuckle complicates manufacture of the fastener and increases the production cost of the fasteners due to the need to change the flat cross-section of the piece of sheet metal to the U-shaped configuration of the fastener hinge knuckle.

U.S. Pat. No. 5,182,933 to Schick discloses a method of producing U-shaped clips for interconnecting conveyor belts. The clips are formed using deep drawing and pressing operations performed consecutively on a metal strip. The clips have upper and lower arms each with apertures through which rivets or fixing staples will extend to fix the clip to one of the ends of the conveyor belt. Loading from conveyor belt operations could cause cracks or areas of weakness to form in the upper and lower arms that spread from the apertures outwardly along the arms. Because the sections of the upper and lower arms that contain the apertures are flat, the ability of the arms to resist crack propagation is dependent on the thickness of the arm sections. Increasing the thickness of the arm sections may make the arm sections stronger and better able to resist crack propagation from the apertures, but the increased thickness of the arm sections increases the height or profile of the clips on the conveyor belt. The increased height of the clips on the conveyor belt produces greater wear and tear on conveyor belt cleaners since the taller clips strike the conveyor belt cleaners with every rotation of the conveyor belt.

SUMMARY OF THE INVENTION

In accordance with one aspect, a conveyor belt fastener for splicing ends of a conveyor belt together is provided having a body with a pair of opposite outboard end portions and an elongate beam portion with a length extending longitudinally between the outboard end portions. The beam portion has an upper portion, a lower portion, and an arcuate loop portion that is curved to orient the upper portion above the lower portion with a gap spacing therebetween. The elongate beam portion has a lateral cross-section thereacross that is substantially uniform along the length of the beam portion. The beam portion operates as a rigid, load bearing member for the conveyor belt fastener and the lateral cross-section of the beam portion provides a relatively large area moment of inertia throughout the beam portion for resisting flexing of the beam portion due to loading from conveyor belt operations. Further, the high rigidity of the beam portion provides strength for resisting deflection at the loop portion, which is subject to high loading from the hinge pin as the conveyor belt travels around a head pulley and idlers of a conveyor belt system.

The fastener body further includes a web portion extending laterally from the beam portion at the upper portion thereof as well as a web portion extending laterally from the beam portion at the lower portion thereof. The web portions have a reduced thickness relative to the beam portions so that the upper and lower portions of the beam portion are raised relative to the laterally adjacent web portions. The fastener body has apertures in the reduced thickness web portions laterally offset from the beam portion and sized to receive an attachment member with the raised upper and lower portions of the beam portion extending along the attachment member received in the apertures of the reduced thickness web portions. Because the upper and lower portions of the beam portion extend along the attachment member, the upper and lower portions of the beam portion can absorb impacts during operation of the conveyor belt rather than the attachment member.

In one form, the upper and lower portions of the beam portion include walls extending outwardly from outer surfaces of the reduced thickness web portions that face away from the conveyor belt. The attachment member may be a staple having legs press-fit in the apertures of one of the reduced thickness web portions and a bight connecting the legs that seats against the outer surface of the one web portion. The outer walls of the beam portion protect the bight and leg ends of the staple once the staple has been driven into the conveyor belt end, as discussed in greater detail below. The upper and lower portions of the beam portion may also include inner surface ribs that sink into the conveyor belt end with clamping of the upper and lower portions of the beam portion on the conveyor belt end to provide high strength gripping of the conveyor belt end.

In accordance with another aspect, a plate fastener for conveyor belts is provided having upper and lower plate portions with variable thicknesses that increase the rigidity of the upper and lower plate portions. More specifically, the upper and lower plate portions each have an outer surface facing away from the belt and an inner surface for engaging the belt. The upper and lower plate portions have a variable thickness between the outer and inner surfaces extending laterally thereacross. The fastener includes at least one attachment member for connecting the plate portions to an end of the conveyor belt and outer surface walls projecting outwardly away from the belt at either side of the attachment member. Because the outer surface walls project outwardly at either side of the attachment member, the material of the outer surface walls resists cracks or areas of weakness propagating from the attachment member and across the upper and lower plate portions. The outer surface walls thereby increase the durability of the fastener by resisting the spread of cracks or areas of weakness from the attachment member.

The upper and lower plate portions have inner surface ribs projecting inwardly toward the belt with the inner surface ribs being vertically aligned with the outer surface walls and laterally offset from the at least one attachment member. The inner surface ribs bite into and engage the conveyor belt with clamping of the upper and lower plate portions onto the conveyor belt end. The upper and lower plate portions have plate sections extending laterally between the aligned walls and ribs that are of constant thickness less than that of the aligned walls and ribs. The thinner plate sections extending laterally between the aligned walls and ribs provide an area to receive the at least one attachment member while the outer surface walls project outwardly on either side of the attachment member to protect the attachment member from, for example, conveyed material or impacting a conveyor belt scraper blade.

In one form, the fastener includes loop portions longitudinally aligned with the outer surface walls and inner surface ribs of the upper and lower plate portions. The loop portions and the vertically aligned outer surface walls and inner surface ribs have the same thickness which is greater than that of the plate sections. The alignment of the loop portions and the vertically aligned walls and ribs, and the resulting uniform thickness therealong, provides high strength to the loop portions by eliminating changes in the thickness between the loop portions and the upper and lower plate portions that may operate as stress concentrators where the loop portions connect to the upper and lower plate portions.

The upper and lower plate portions and the loop portions may be made from cold-rolled or cold-drawn material such that they are very hard and durable. In one approach, the upper and lower plate portions and loop portions are made from cold-rolled steel and have a hardness in the range of approximately 95 to approximately 105 on the Rockwell B scale, and preferably a hardness of approximately 100 on the Rockwell B scale.

In another aspect, a hinge-loop plate fastener for splicing conveyor belt ends together is provided. The fastener has a body formed of rolled stock material with a predetermined high hardness level. The fastener body includes rolled upper and lower plate portions each having a variable cross-section extending laterally thereacross. The plate portions have rolled outer and inner raised portions with the outer raised portions extending longitudinally on either side of at least one attachment member. The fastener further includes rolled loop portions that include the high hardness level of the stock material and have an arcuate configuration to extend between the plate portions. Because the arcuate loop portions are rolled and have the high hardness level of the rolled stock material, the loop portions do not need additional processing to obtain the predetermined high hardness level thereof. This approach stands in contrast to prior fasteners, such as the fastener of U.S. Pat. No. 4,060,877 to Schick, having a hinge knuckle with a U-shaped cross-section formed by folding sections of the hinge knuckle back onto itself to build up the hinge knuckle which complicates manufacture of this prior fastener.

In one form, the rolled loop portions are aligned with and extend continuously with the outer raised portions of the upper and lower plate portions. This improves the tensile load sharing between the raised portions extending along the plate portions and the loop portions contacting the hinge pin of the conveyor belt.

In accordance with another aspect, a plate fastener for connecting ends of a conveyor belt together is provided including three staples each having a pair of leg portions and a bight portion connecting the leg portions. The fastener has an upper plate portion with an inboard edge for being disposed adjacent an end of a belt with the upper plate portion clamped thereto by the staples. A middle one of the three staples is offset longitudinally closer to the inboard edge of the upper plate portion leaving the other outer staples farther from the inboard edge. The leg portions of the outer staples thereby penetrate the belt farther from the conveyor belt end than the corresponding leg portions of the middle staple which positions a thicker section of the conveyor belt between the outer staple leg portions and the end of the conveyor belt and increases the pull-out resistance of the fastener from the conveyor belt. In other words, the outer staple leg portions penetrate the belt farther from the conveyor belt end than the middle staple leg portions thereby increasing the reach-back of the outer staples in the conveyor belt and improving the pull-out resistance of the fastener from the conveyor belt.

In one form, the plate fastener is a hinge-loop plate fastener and further comprises a lower plate portion and at least one hinge loop portion connecting the upper and lower plate portions. The upper plate portion has three pairs of apertures for the staples in the upper plate portion with each of the apertures in a pair being longitudinally aligned. The lower plate also has three pairs of apertures aligned with the aperture pairs in the upper plate portion. Because the apertures of the upper and lower plate portions are aligned, the leg portions of the staples may be driven through the apertures of the upper plate portion, through the conveyor belt, and into the apertures of the lower plate portion. The staple leg portions include ends that are bent against an outer surface of the lower plate portion after passing through the lower plate portion apertures.

The upper plate portion may have a variable cross-sectional thickness including channels in which the upper plate portion apertures are formed and upstanding walls extending longitudinally along either side of at least two of the channels. The upstanding walls protect bights of the corresponding staples seated in the channels with the upper plate portion clamped to the belt. The channels can include an outer channel formed on a ledge portion of the upper plate portion that extends to one of the lateral sides of the upper plate with one of the upstanding walls at the other lateral side. When upper plate portions of a pair of fasteners are attached next to one another on a conveyor belt, the upstanding wall at the lateral side of one of the upper plate portions cooperates to protect the bight of the staple associated with the ledge portion of the other of the upper plate portions.

The upper plate portion of the fastener may further have vertical surfaces extending between outer and inner surfaces of the upper plate portion at the lateral sides thereof. The vertical surfaces are contoured to allow adjacent upper plate portions to be attached across a conveyor belt in closely spaced or engaged relation. The vertical surfaces provide clearance between the adjacent upper plate portions and permit movement of the upper plate portions relative to each other with belt troughing. By permitting movement of the adjacent upper plate portions, the conveyor belt to which the upper plate portions are attached undergoes less stretching at the area between the upper plate portions which decreases the stress in the conveyor belt during troughed operation thereof.

In accordance with another aspect, a method of manufacturing a plate fastener for a conveyor belt is provided. The method includes advancing a longitudinally extending strip of material having a variable cross-sectional thickness in a lateral direction across the strip longitudinally through processing equipment to form the plate fastener. The variable cross-sectional thickness of the strip includes at least one channel continuously extending longitudinally along the strip. The method further includes forming small apertures through thinner material of the strip at fastener plate portions of the at least one channel with the processing equipment for allowing at least one attachment member of the plate fastener to extend through the small apertures. Because the small apertures are formed in the fastener plate portions of the at least one channel, the at least one channel can receive and protect the at least one fastener member with the fastener member extending through the small apertures.

In one approach, the strip of material has been cold-rolled or cold-drawn to provide the variable cross-sectional thickness in the lateral direction across the strip prior to advancing the strip longitudinally through the processing equipment to form the plate fastener. By utilizing cold-rolling or cold-drawing to provide the variable cross-sectional thickness in the strip, the processing equipment which is used to form the plate fastener does not need to include operations that form the variable cross-sectional thickness of the strip. This stands in contrast to some prior approaches that require folding-over sections of a strip of material to build up the cross-section of the fastener, such as in U.S. Pat. No. 4,060,877 to Schick. The processing equipment for performing the method may therefore be more efficient and less costly to operate, such as by requiring smaller tonnage presses to form the plate fastener from the strip of material.

The method may also include forming at least one elongate window through thinner material of the strip between the fastener plate portions of the at least one channel with the processing equipment to leave at least one thicker portion of the strip adjacent the window for forming at least one thick loop portion of the plate fastener. By forming the at least one elongate window in the strip of material, the at least one elongate window of the fastener formed from the strip of material provides clearance to receive at least one loop portion of a nearby fastener when the fasteners are connected to opposing ends of a conveyor belt and the loop portions are interengaged about a hinge pin. Further, the strip of material has a predetermined hardness and forming the at least one window does not change the predetermined hardness of the material in the loop portions. Thus, the at least one loop portion has high hardness and strength without requiring the additional folding-over operations of the prior art which simplifies the manufacture of the fastener.

BRIEF DESCRIPTION OF THE DRAWINGS

FIGS. 19 and 20 are top and bottom plan views of the body of the fastener of FIG. 11 before the loop portions of the body are bent and the staples are preset in the upper plate portion of the fastener;

FIG. 21 is a perspective view of a conveyor belt splice including fasteners secured to ends of the conveyor belt with loop portions of the fasteners on one end of the conveyor belt intermeshed about a hinge pin with loop portions of fasteners on the other end of the conveyor belt;

FIG. 22 is a perspective view of a set of several fasteners of FIG. 21 showing three staples preset on an upper plate portion of each of the fasteners;

FIG. 23 is a plan view of one of the conveyor belt ends and the hinge pin of FIG. 21 showing the staples of the fasteners driven into the conveyor belt end and loops of the fasteners extending about the hinge pin;

FIG. 24 is a cross-sectional view taken across line 24-24 in FIG. 23 showing legs of the staples extending through the conveyor belt between the upper and lower plate portions of one of the fasteners;

FIG. 25 is a cross-sectional view taken across line 25-25 in FIG. 23 showing a substantially constant thickness of a raised wall on the upper plate portion of the fastener, an aligned loop portion of the fastener, and a raised wall on the lower plate portion of the fastener;

FIG. 26 is a cross-sectional view taken across line 26-26 in FIG. 23 showing legs of the staples extending through the conveyor belt and ends of one of the staples bent against an outer surface of the lower plate portion of the fastener;

FIG. 27 is a cross-sectional view of the upper plate portion of the fastener taken across line 27-27 in FIG. 22 showing a varying cross-section of the upper plate portion including raised walls on an outer surface of the upper plate portion and raised ribs on an inner surface of the plate portion;

FIG. 28 is a cross-sectional view of the lower plate portion of the fastener taken across line 28-28 in FIG. 22 showing a connecting wire secured to an inner surface of the lower plate portion of the fastener;

FIG. 29 is an enlarged view of a portion of FIG. 26 showing a staple leg extending through an aperture in the lower plate portion and an end portion of the staple leg bent against the outer surface of the lower plate portion;

FIG. 33 is a cross-sectional view taken across line 33-33 in FIG. 23 showing in dashed the fasteners pivoted to inclined positions in response to troughing of the conveyor belt and laterally outer, vertical surfaces of the fasteners bearing against each other;

FIG. 34 is a top plan view of a body of one of the fasteners of FIG. 22 before the loop portions thereof are bent and the staples are preset in the upper plate portion;

FIG. 35 is a bottom plan view of the fastener body of FIG. 34 showing the rib portions on the inner surfaces of the fastener body laterally offset from the loop portions;

FIG. 36 is an end elevational view taken across line 36-36 in FIG. 23 showing fasteners of one conveyor belt end disposed side-by-side along the hinge pin and loop portions of the fasteners extending about the hinge pin;

FIG. 37 is a schematic, end elevational view of the hinge pin of FIG. 21 showing the hinge pin and one conveyor belt end bowed due to troughing of the conveyor belt and loop portions of selected ones of the fasteners of the conveyor belt end illustrated on the hinge pin angled due to the conveyor belt troughing;

DETAILED DESCRIPTION OF THE PREFERRED EMBODIMENTS

Figure 1:
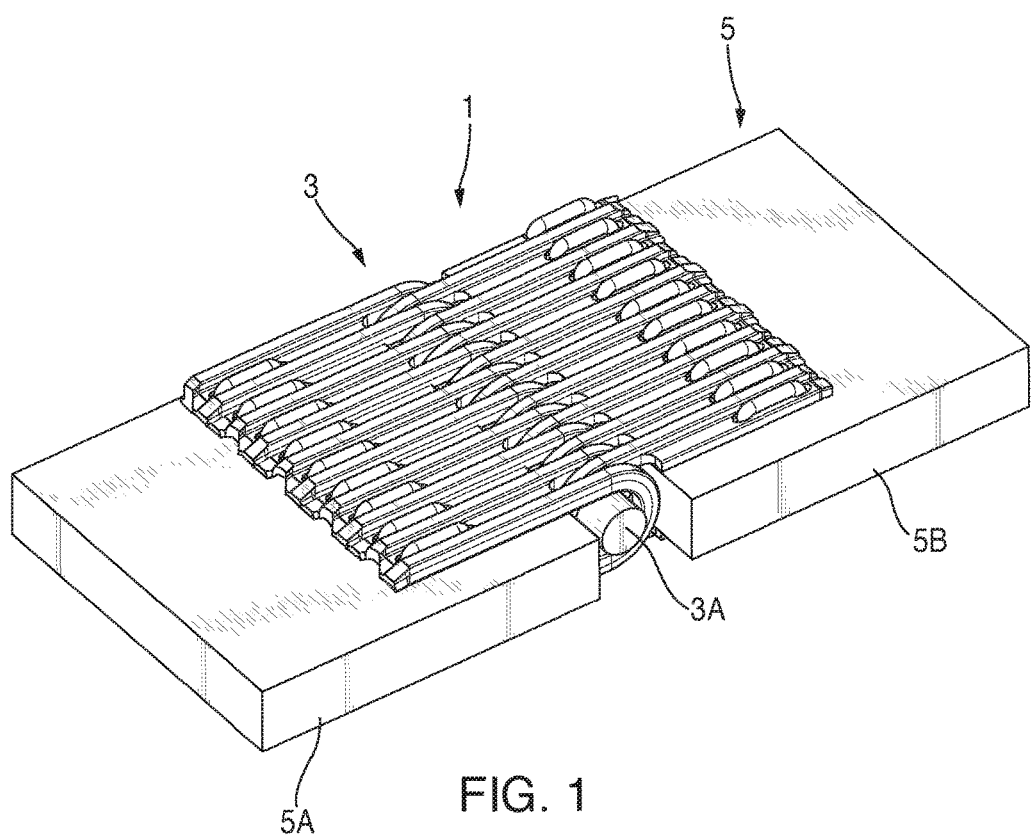
FIG. 1 is a perspective view of a conveyor belt splice including fasteners secured to ends of a conveyor belt with loop portions of the fasteners on one end of the conveyor belt intermeshed about a hinge pin with loop portions of fasteners on the other end of the conveyor belt.
Figure 2:
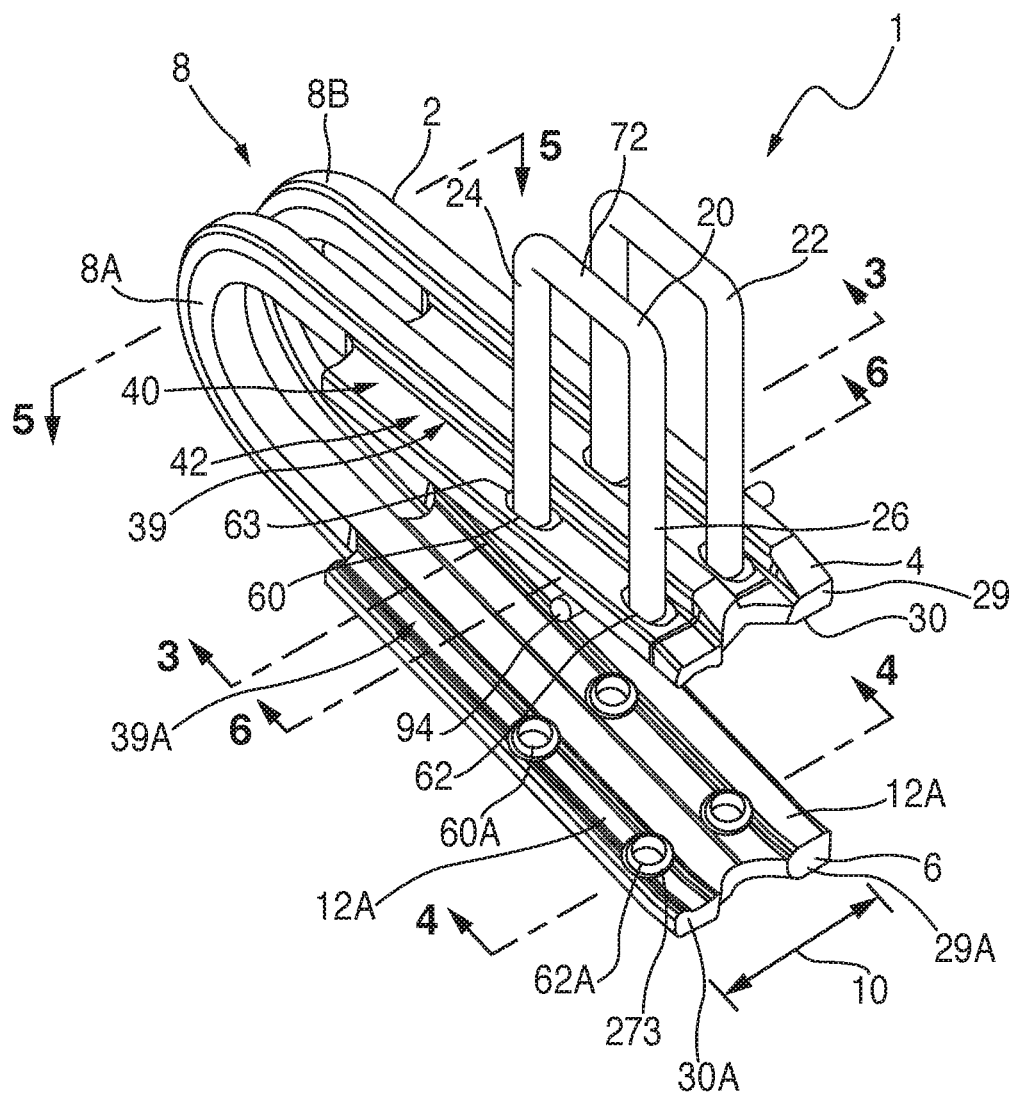
FIG. 2 is a perspective view of one of the fasteners of FIG. 1 showing two staples preset in an upper plate portion of the fastener.
Figure 2A:
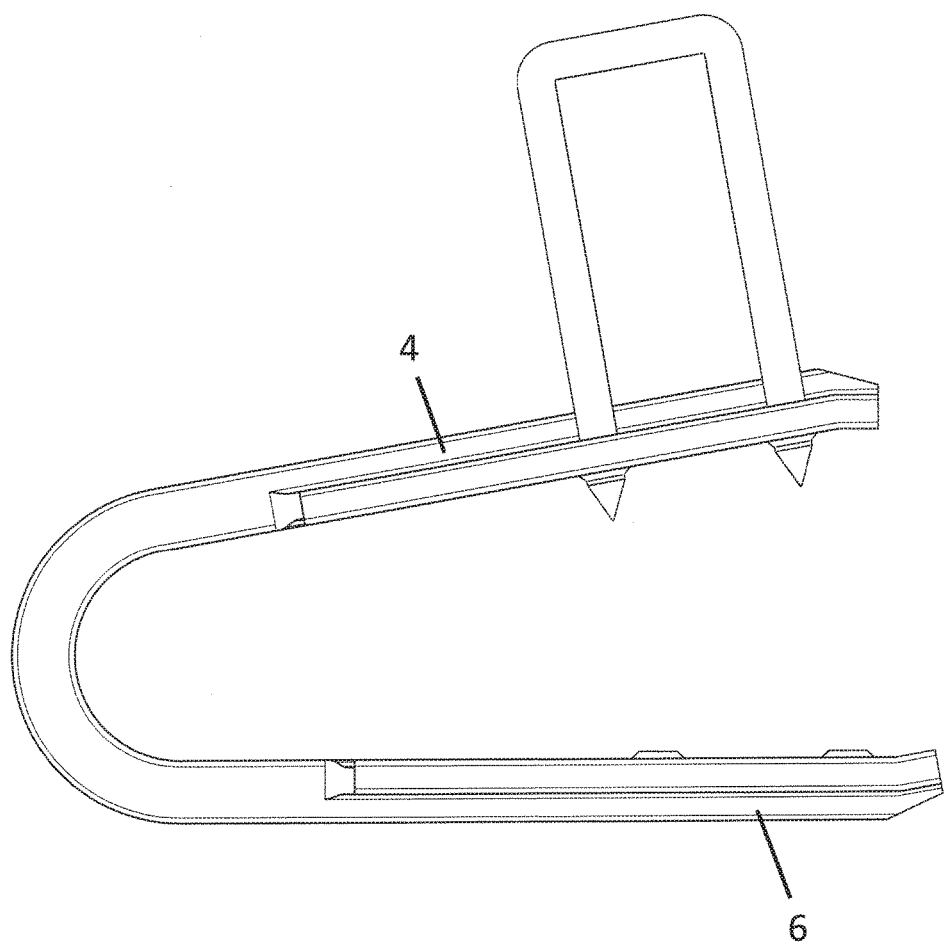
FIG. 2A is a side elevational view of the fastener of FIG. 2 showing the upper plate portion and a lower plate portion of the fastener in an open configuration prior to being clamped onto the end of a conveyor belt.

With reference to FIGS. 1 and 2, fasteners 1 of a conveyor belt splice 3 are provided for joining ends 5A, 5B of a conveyor belt 5 together. The fasteners 1 have arcuate loop portions 8 for extending around a hinge pin 3A of the splice 3 and being intermeshed with loop portions 8 of fasteners 1 on the opposite ends 5A, 5B of the conveyor belt 5. Each fastener 1 has a body 2 including upper and lower plate portions 4, 6 and loop portions 8 with an arcuate configuration connecting the upper and lower plate portions 4, 6. With reference to FIG. 2A, the upper and lower plate portions 4, 6 are initially in a spaced, open configuration with the plate portions 4, 6 extending obliquely to each other which permits the fastener 1 to be positioned onto one of the ends 5A, 5B of the conveyor belt 5. The upper and lower plate portions 4, 6 are then clamped onto the end 5A, 5B which reconfigures the upper and lower plate portions 4, 6 into a closed configuration so that they extend generally parallel to each other similar to the fastener 300 in FIG. 12. The fastener 1 has one or more attachment members, such as staples 20, 22 with legs 24, 26, preset in the upper plate portion 4 for driving into the conveyor belt end 5A, 5B and securing the conveyor belt end 5A, 5B between the upper and lower plate portions 4, 6 clamped onto the conveyor belt end 5A, 5B. As used herein, the term conveyor belt is intended to encompass a single conveyor belt or a belt comprised of a plurality of conveyor belts. For example, the fasteners 1 may be used to form a splice 3 between the ends 5A, 5B of a single conveyor belt 5. As another example, the conveyor belt 5 may include two conveyor belts 5 and the fasteners 1 may be used to form a splice 3 between the end 5A of one of the conveyor belts 5 and the end 5B of the other conveyor belt 5.

Figure 3:
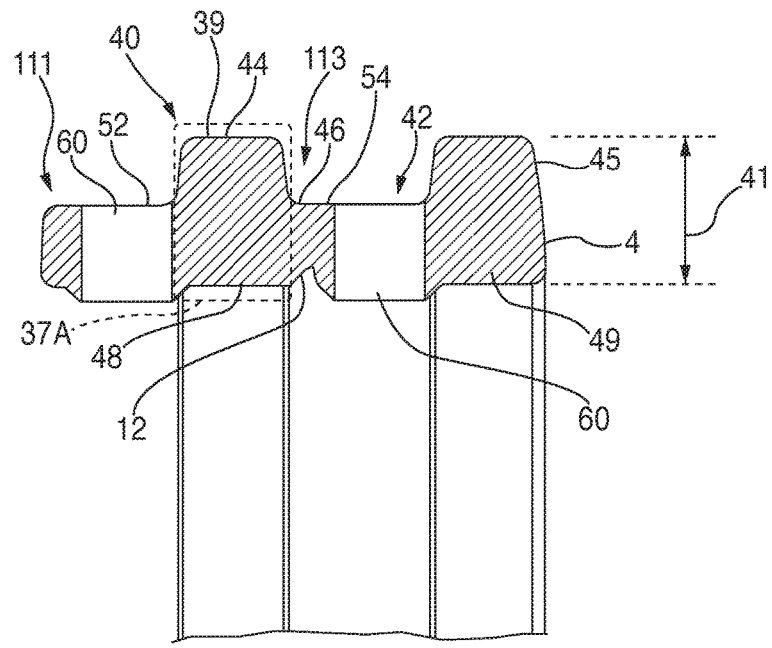
FIG. 3 is a cross-sectional view of the upper plate portion taken across line 3-3 in FIG. 2 showing apertures of the upper plate portion laterally offset from raised walls on an outer surface of the plate portion.
Figure 4:
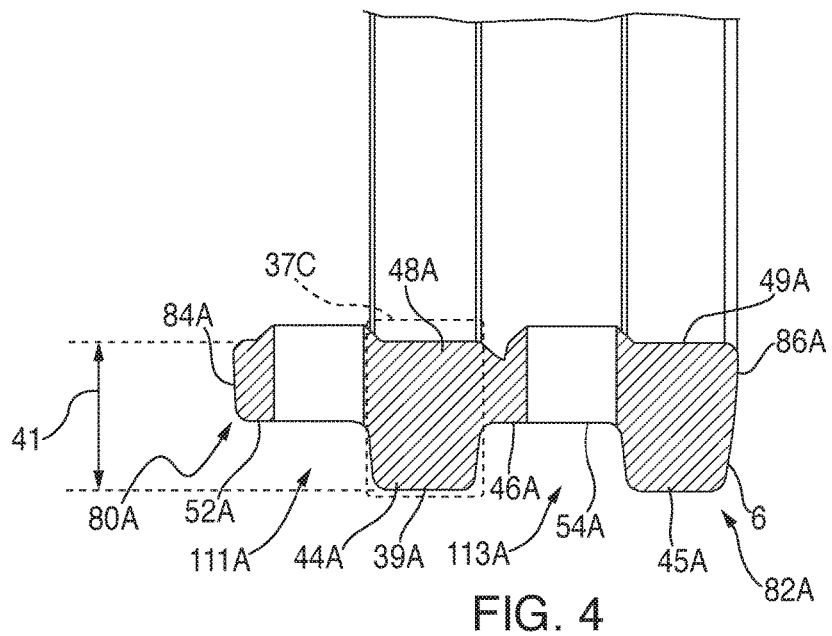
FIG. 4 is a cross-sectional view of the lower plate portion taken across line 4-4 in FIG. 2 showing raised walls extending outwardly from an outer surface of the lower plate portion.

With reference to FIGS. 2, 3, and 4, the fastener body 2 has a varying cross-section in a lateral direction across the upper and lower plate portions 4, 6 including a varying thickness of the upper and lower plate portions 4, 6 extending between outer and inner surfaces 46, 12 and 46A, 12A thereof. The varying cross-section of the fastener body 2 includes a pair of thicker, beam portions 40 extending longitudinally between outboard end portions 30, 30A (see FIG. 2) that operate as load-bearing members to resist bending and impacts from conveyor belt operations. The varying cross-section of the fastener body 2 also includes reduced thickness web portions 42 extending laterally from the beam portions 40 at the upper and lower plate portions 4, 6. The reduced thickness web portions 42 provide areas to receive the staples 20, 22 at a recessed position between the beam portions 40 so that the beam portions 40 protect the staples 20, 22 during operation of the conveyor belt 5.

The beam portions 40 include upper and lower portions 39, 39A (see FIG. 2) at the upper and lower plate portions 30, 32 and the beam portions 40 further include the loop portions 8 intermediate the upper and lower portions 39, 39A. The beam portions 40 each have a cross-section taken laterally thereacross that is substantially uniform for the length of the beam portion 40 between the outboard end portions 30, 30A of the body 2. With respect to FIGS. 3-5, the cross section of one of the beam portions 40 at the upper portion 39, loop portion 8A, and lower portion 39A are identified, respectively, with dashed boxes 37A, 37B, 37C. The cross section of the beam portion 40 may be generally polygonal, such as the generally rectangular cross-section shown in FIGS. 3-5, which is uniform along the length of the beam portion 40.

Figure 5:
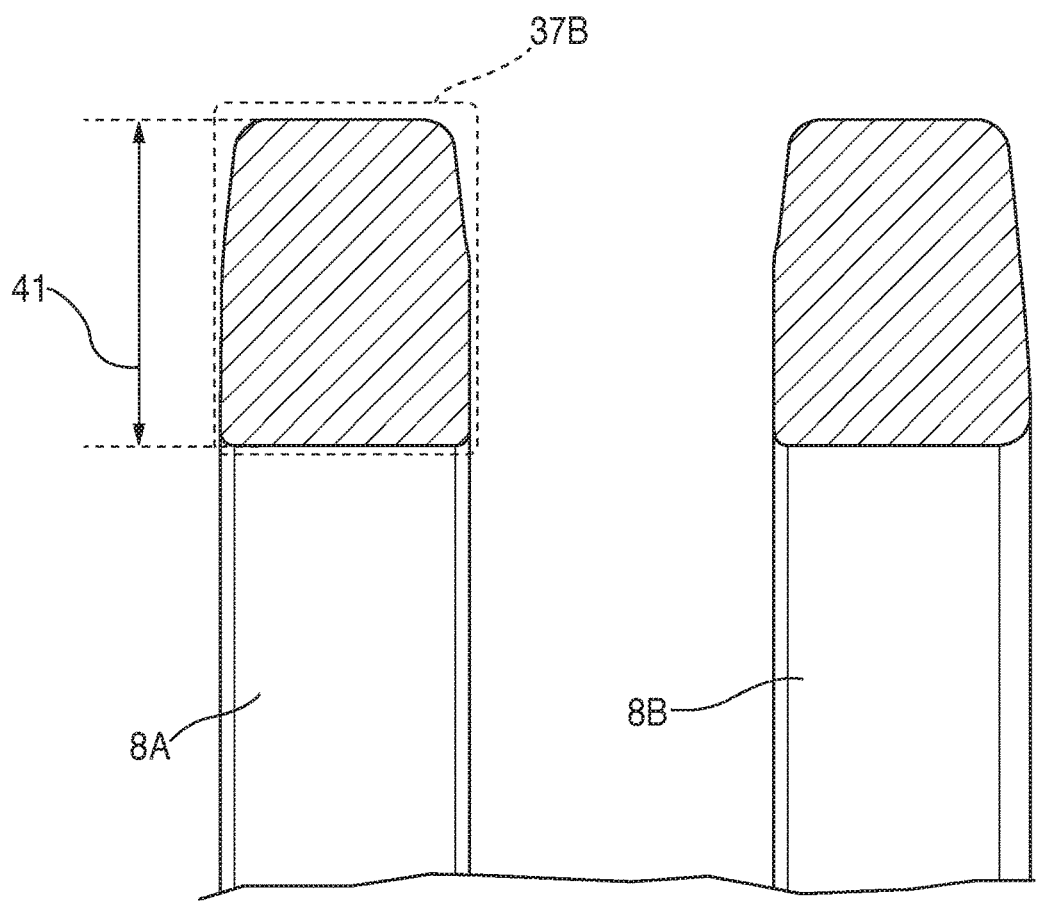
FIG. 5 is a cross-section taken across line 5-5 in FIG. 2 showing a cross-section of loop portions of the fastener having thicknesses that match the thicknesses of the upper and lower plate portions at the raised walls shown in FIGS. 3 and 4.

The substantially uniform cross-section of the beam portion 40 is intended to encompass localized deviations in the cross-sections of the beam portion 40 such as deviations due to coining of the beam portion 40 and deviations due to manufacturing variation in the dimensions of a strip 183 of stock material from which the body 2 is formed. As shown in FIGS. 3-5, the beam portions 40 also have a substantially constant thickness 41 throughout including the loop portions 8 and the upper and lower portions 39, 39A such that the beam portions 40 provide a rigid construct to resist loading during conveyor belt operations. Like the substantially uniform cross-section of each beam portion 40 along its length, the substantially constant thickness 41 is intended to encompass localized deviations in the thickness 41 such as deviations due to coining of the beam portion 40 and deviations due to manufacturing variation in the dimensions of the strip 183 of stock material.

Figure 6:
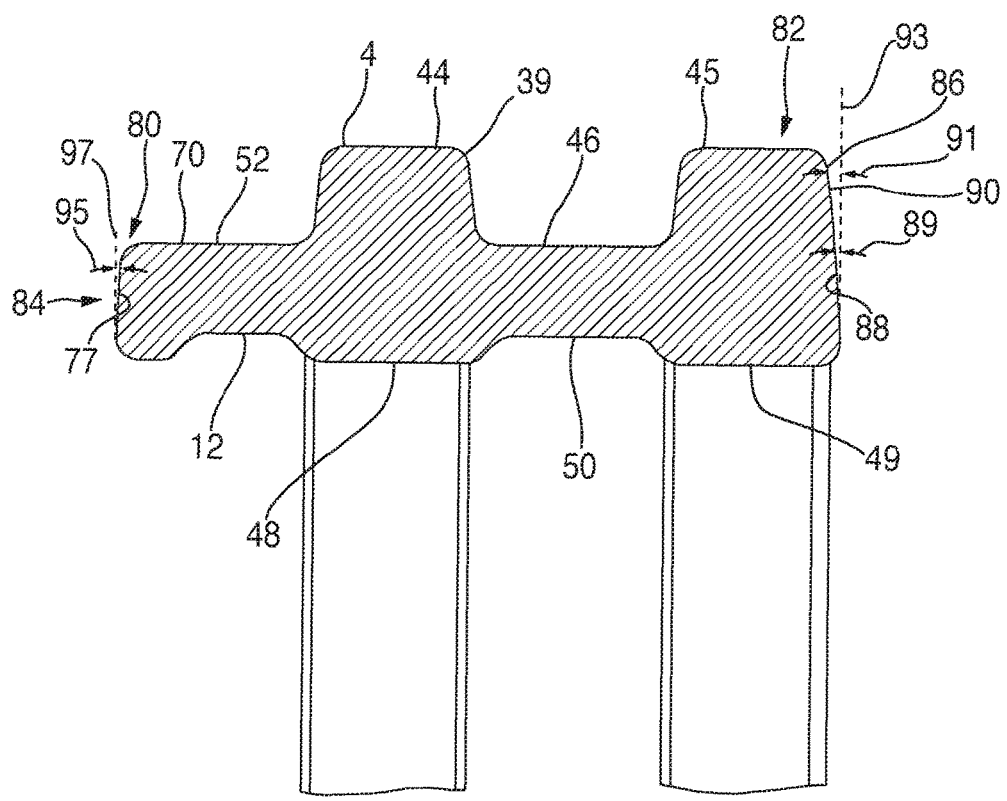
FIG. 6 is a cross-section taken across line 6-6 in FIG. 2 showing raised ribs on an inner surface of the upper plate portion vertically aligned with the walls on the outer surface of the upper plate portion.

With reference to FIGS. 3 and 6, the upper portions 39 of the beam portions 40 include outer raised walls 44, 45 extending outwardly from outer surface 46 of the upper plate portion 4 and inner raised ribs 48, 49 extending inwardly from the inner surface 12 of the upper plate portion 4. The outer raised walls 44, 45 form channels 111, 113 extending longitudinally along the upper plate portion 4 that receive bights 72 of the staples 20, 22. Similarly, the lower portions 39A of the beam portions 40 include outer raised walls 44A, 45A (see FIG. 4) extending outwardly from the outer surface 46A of the lower plate portion 6 and inner raised ribs 48A, 49A extending inwardly from the inner surface 12A of the lower plate portion 6. The outer raised walls 44A, 45A form channels 111A, 113A for receiving bent-over ends of the legs 24, 26 of the staples 20, 22. Specifically, the ends of the legs 24, 26 are bent over at approximately a ninety-degree angle to the remainder of the legs 24, 26 extending through the belt 5 so that the bend leg ends engage against the outer surface 46A in the channels 111A, 113A.

The outer raised walls 44, 45 and 44A, 45A of the upper and lower plate portions 4, 6 protect the bights 72 and the bent-over ends of the legs 24, 26 of the staples 20, 22 by absorbing impacts and reducing abrasion from surrounding structure, such as a conveyor belt cleaner engaged with an outer surface of the belt 5 and rollers supporting an inner surface of the conveyor belt 5. In one form, the raised walls 44, 45 and 44A, 45A have a height that is less than the diameter of the staples 20, 22. Although small portions of the bights 72 and ends of the legs 24, 26 of the staples 20, 22 would initially protrude outward beyond the walls 44, 45 and 44A, 45A, these protruding portions of the staples 20, 22 will wear down due to impacts and abrasion from the conveyor belt cleaner engaged with the outer surface of the belt 5 and the rollers supporting the inner surface of the conveyor belt 5 until the bights 72 and ends of the legs 24, 26 no longer protrude outward beyond the walls 44, 45 and 44A, 45A. The walls 44, 45 and 44A, 45A then absorb impacts and abrasion from the cleaner blades and rollers rather than the bights 72 and the ends of the legs 24, 26. In this manner, the walls 44, 45 and 44A, 45A limit the amount the bights 72 and ends of the legs 24, 26 can wear down during operation of the conveyor belt 5.

With reference to FIGS. 4 and 6, the outer walls 44, 45, 44A, 45A and inner ribs 48, 49, 48A, 49A form a crenulated cross-section of the upper and lower plate portions 4, 6. The vertically aligned outer walls 44, 45, 44A, 45A and inner ribs 48, 49, 48A, 49A are also longitudinally aligned with the loop portions 8A, 8B. As discussed in greater detail below, this alignment permits the loop portions 8A, 8B to have the same thickness 41 as the vertically aligned walls 44, 45, 44A, 45A and ribs 48, 49, 48A, 49A which reduces stress risers in the body 2 due to changes in material thickness at the connections between the loop portions 8A, 8B and the upper and lower plate portions 4, 6.

With reference to FIGS. 2, 3, and 4, the inner surfaces 12, 12A of the upper and lower plate portions 4, 6 face toward each other and the belt end 5A, 5B. The outer surfaces 46, 46A of the upper and lower plate portions 4, 6 face away from the belt end 5A, 5B. Because the upper and lower plate portions 4, 6 are on opposite sides of the belt end 5A, 5B, the outer surface 46 of the upper plate portion 4 is an upper surface of the upper plate portion 4 and the inner surface 12 is a lower surface of the upper plate portion 4. Conversely, the outer surface 46A of the lower plate portion 6 is a lower surface of the lower plate portion 6 and the inner surface 12A is an upper surface of the lower plate portion 6.

The web portions 42 of the upper and lower plate portions 4, 6 include reduced thickness plate sections 52, 54, 52A, 54A with pairs of apertures 60, 62 and 60A, 62A formed in the reduced thickness plate sections 52, 54, 52A, 54A. The apertures 60, 62 and 60A, 62A are sized to receive legs 24, 26 of the staples 20, 22 as discussed in greater detail below. The reduced thickness plate sections 52, 54, 52A, 54A are of substantially constant thickness laterally across and longitudinally along the upper and lower plate portions 4, 6. It is intended that this substantially constant thickness of the plate sections 52, 54, 52A, 54A includes localized deviations in the thickness around the apertures 60, 62 and 60A, 62A which may be produced during forming of the apertures 60, 62 and 60A, 62A.

Figure 7:
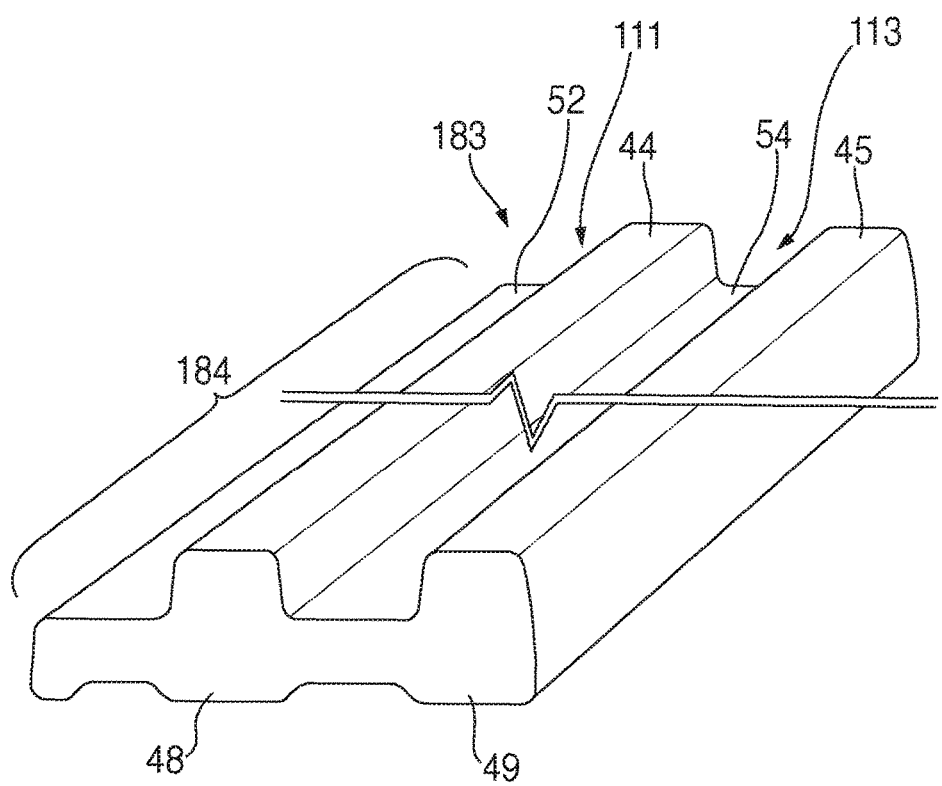
FIG. 7 is a perspective view of a strip of material from which a body of the fastener of FIG. 2 is manufactured showing the vertically aligned walls and ribs already formed in the strip of material.

The body 2 may be manufactured from the elongate strip 183 (see FIG. 7) of cold-formed stock material, such as cold-rolled or cold-drawn steel, such that the body 2 is very rigid and durable. One approach for forming the body 2 from the elongate strip 183 is discussed below with respect to FIG. 10. The cold rolling or cold-drawing process forms the varying cross-section of the elongate strip 183 including the walls 44, 45, ribs 48, 49, and reduced thickness plate sections 52, 54 into the strip 183. Because the body 2 may be manufactured from the cold-rolled or cold-drawn strip 183, the upper and lower plate portions 4, 6 and loop portions 8 are very durable without requiring additional processing or separate manufacturing steps to build up the cross-section of the upper and lower plate portions 4, 6 and loop portions 8. As used herein, cold-rolled or cold-drawn material refers to material that has been rolled or drawn when the temperature of the material is below its recrystallization temperature. Rolled material refers to material that has gone through one or more rolling stands, with each rolling stand having rollers under a high tonnage that impart a change in cross-section to the material. The rollers of the rolling stand(s) impart plastic deformation in the material and increase the size of the grain of the material. Typically, the rolling process orients the grains of the material to be parallel to the feed direction of the material through the rollers of the rolling stand(s). As used herein, drawn material refers to material that has been pulled through one or more dies to change the cross-section of the material. Like rolling, drawing the material plastically deforms the material and can be used to progressively change the cross section of the material by pulling the material through a sequence of one or more dies.

The staples 20, 22 are disposed along the upper plate portion 4 at even longitudinal positions for providing a substantially uniform longitudinal position of the staples 20, 22 in the conveyor belt ends 5A, 5B when the fastener 1 is secured thereto. Stated differently, the staples 20, 22 are equally spaced from outboard edges 29, 29A of the upper and lower plate portions 4, 6. The uniform longitudinal positioning of the staples 20, 22 of the fasteners 1 may be desired in some applications to provide uniform reach-back of the staples 20, 22 and a more uniform loading on the conveyor belt end 5A, 5B.

With reference to FIG. 2, the upper and lower plate portions 4, 6 also have a relatively narrow, lateral width 10. The narrow lateral width 10 of the upper and lower plate portions 4, 6 is sized to accommodate conveyor belt troughing. Specifically, the space each fastener 1 takes up along the hinge pin 3A is minimized which improves troughing by decreasing the amount of angulation each fastener 1 has to provide to accommodate the troughed conveyor belt. The width 10 may be in the range of approximately 0.5 inches to approximately 0.6 inches, such as approximately 0.56 inches. The loop portions 8A, 8B of the fastener body 2 have a narrow width along the hinge pin 3A which further improves load sharing between fasteners 1 on the hinge pin 3A. The width of each loop portion 8A, 8B is in the range of approximately 0.1 inches to approximately 0.15 inches, such as approximately 0.12 inches.

The narrow width 10 of the upper and lower plate portions 4, 6 also permits the inner surfaces 12, 12A thereof to have a smaller footprint on the conveyor belt end 5A, 5B than some prior, wider fasteners. This smaller footprint permits the upper and lower plate portions 4, 6 to sink farther into the conveyor belt end 5A, 5B because the upper and lower plate portions 4, 6 are compressing a smaller section of the conveyor belt end 5A, 5B. By sinking farther into the conveyor belt end 5A, 5B, the upper and lower plate portions 4, 6 may more firmly grasp the conveyor belt end 5A, 5B.

With reference to FIG. 6, the reduced thickness plate section 52 includes a ledge portion 70 disposed laterally outward from the wall 44. With reference to FIG. 2, driving the legs 24, 26 of the staple 20 into the apertures 60, 62 in the ledge portion 70 seats the bight 72 on the ledge portion 70. When multiple fasteners 1 are secured to the conveyor belt end 5A, 5B, the wall 44 of one fastener 1 extends longitudinally along the staple bight 72 received on the ledge portion 70 of the fastener 1 and protects one lateral side of the staple bight 72. To protect the opposite lateral side of the bight 72, the wall 45 of a laterally adjacent fastener 1 on the conveyor belt end 5A, 5B extends along the bight 72 on an opposite lateral side of the bight 72 from the wall 44. The walls 44, 45 of the two adjacent fasteners 1 thereby operate together to protect the staple bight 72 seated on the ledge portion 70 in a manner similar to the walls 1044 and 1046 discussed below with respect to fasteners 1010A, 1010B (see FIG. 36).

With reference to FIGS. 4 and 6, the upper and lower plate portions 4, 6 include opposite lateral portions 80, 82 and 80A, 82A. The lateral portions 80, 82 and 80A, 82A include vertical surfaces 84, 86 and 84A, 86A. The vertical surfaces 84, 86 of the upper plate portion 4 have different contours from one another and the vertical surfaces 84A, 86A of the lower plate portion 6 have different contours from one another. Specifically, the vertical surfaces 86, 86A each have inner and outer portions 88, 90 with different angles 89, 91 relative to axis 93 extending orthogonal to the plate inner surfaces 12, 12A in a manner similar to the vertical surface 400 discussed below with respect to FIG. 17. On the opposite lateral side of the upper and lower plate portions 4, 6, the vertical surfaces 84, 84A generally have a single straight portion 77 oriented at an angle 95 to an axis 97 in a manner similar to the vertical surface 396 discussed below with respect to FIG. 16. The angle 95 may be in the range of approximately two to approximately fifteen degrees, such as approximately three degrees.

Figure 8:
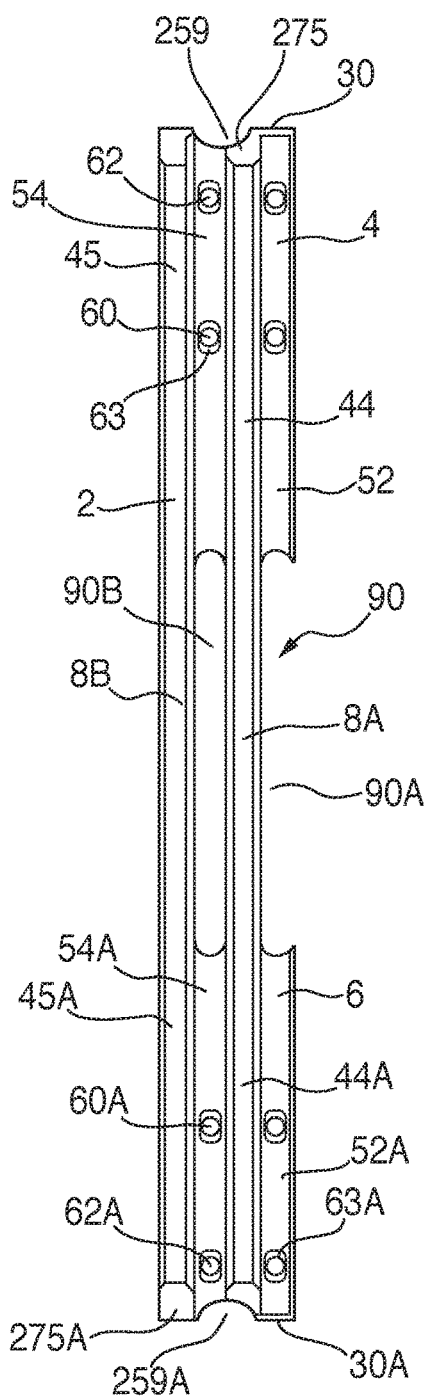
FIGS. 8 and 9 are top and bottom plan views of the body of the fastener of FIG. 2 before the loop portions of the body are bent and staples are preset in the upper plate portion.
Figure 9:
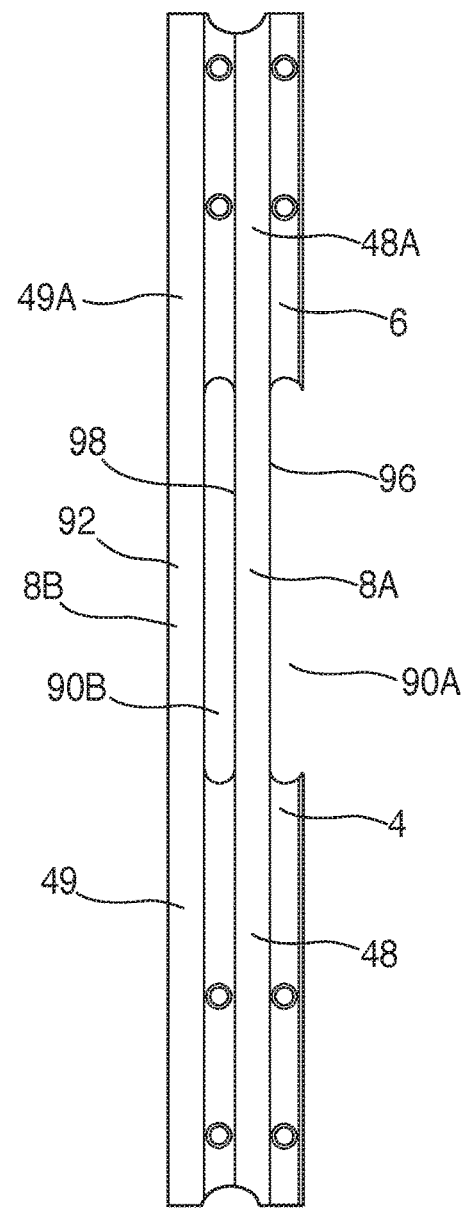

With reference to FIGS. 8 and 9, the body 2 of the fastener 1 is shown prior to the loop portions 8A, 8B being bent to position the upper plate portion 4 above the lower plate portion 6 in a vertically spaced configuration. With reference to FIG. 8, the walls 44, 45 and 44A, 45A on the upper and lower plate portions 4, 6 are longitudinally aligned along the body 2 with the loop portions 8A, 8B. The reduced thickness plate sections 52, 52A and 54, 54A of the respective upper and lower plate portions 4, 6 are spaced longitudinally from each other by windows 90 which may be formed in the body 2 using an operation discussed in greater detail below.

With reference to FIG. 9, the ribs 48, 49 and 48A, 49A of the upper and lower plate portions 4, 6 are aligned longitudinally with the loop portions 8A, 8B. The loop portions 8A, 8B include inner bearing surfaces 92 thereof which contact and move about the hinge pin 3A.

Figure 10:
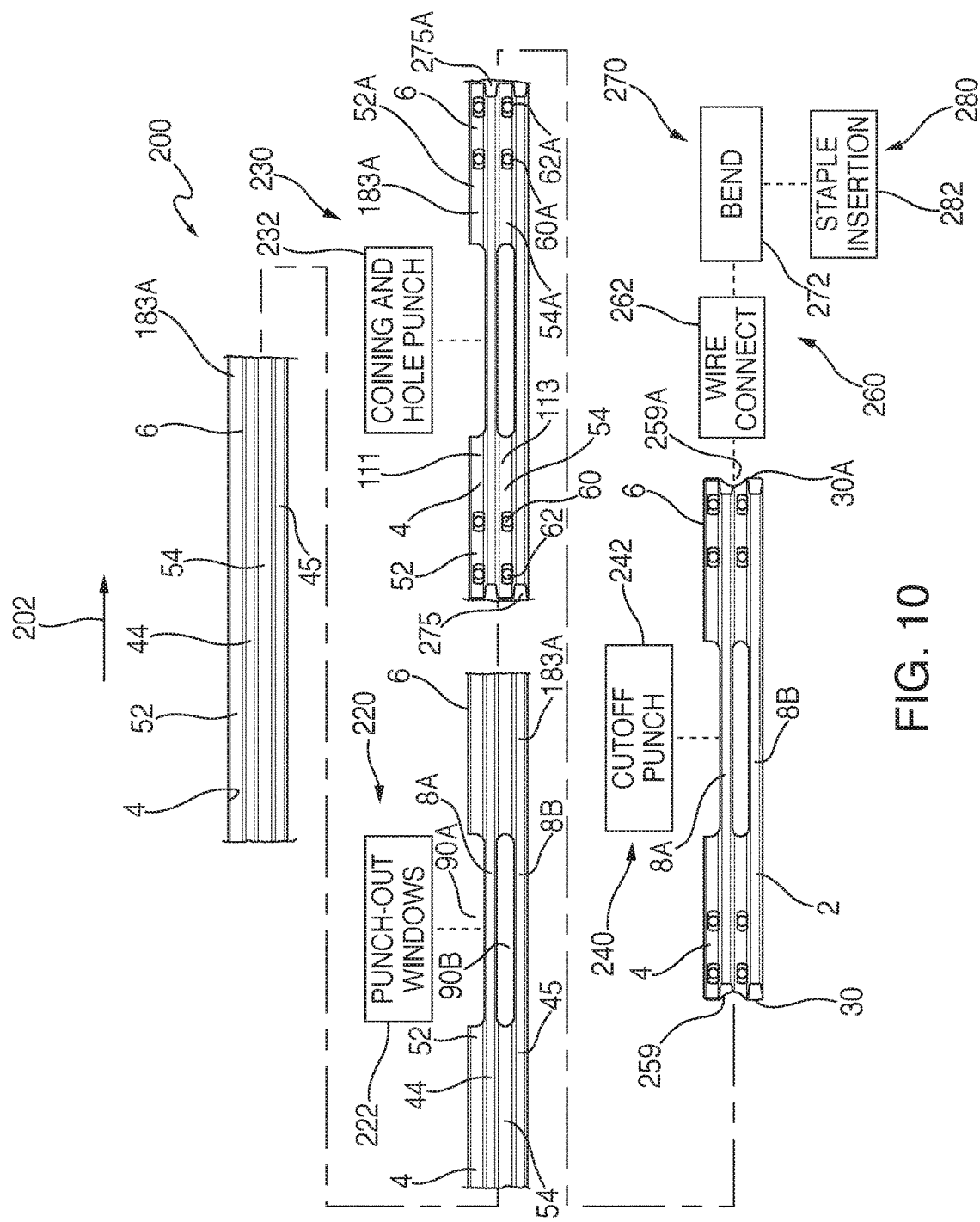
FIG. 10 is a schematic representation of a method of forming the fastener of FIG. 2.

With reference to FIG. 10, a method 200 is provided for rapidly and sequentially forming fasteners, such as the fastener 1, from an elongated strip of material, such as the strip 183. The method 200 includes running the strip 183 through processing equipment to form the fastener 1. Initially, the strip 183 is provided having a length 184 longer than the length of the fastener body 2 and may be provided in the form of a coil. The strip 183 may have a number of sections along its length 184 from which the bodies 2 of fasteners 1 will be sequentially produced using the method 200. The following discussion follows one strip section 183A as it travels through operations 220, 230, 240, 260, 270, 280 of the method 200.

Initially, the strip section 183A of the strip 183 is advanced in longitudinal direction 202 to a stamping operation 220 that includes window punching 222 for forming windows 90 in the strip section 183A and forming the loop portions 8A, 8B. As used herein, the term forming relates to any operation that provides a structural feature and is not limited to a particular approach for producing the structural feature. For example, the term forming as used herein is not intended to be limited to plastically deforming a member to impart a particular shape to the member. The window punching 222 removes material from the strip section 183A at the reduced thickness section 54 (see FIG. 7) between the walls 44, 45 and forms the window 90B in the strip section 183A. The window punching 222 also removes material from the strip section 183A at the reduced thickness section 52 and forms the window 90A in the strip section 183A. As shown in FIG. 10, the window punching 222 forms the elongate windows 90A, 90B in the reduced thickness sections 52, 54 of the strip section 183A between the upper and lower plate portions 4, 6 which leaves the vertically aligned walls 44, 45 and ribs 48, 49 (see FIG. 7) extending along the strip section 183A and forms the loop portions 8A, 8B of the fastener body 2.

With reference to FIG. 10, the strip section 183A is longitudinally advanced in direction 202 to a stamping operation 230 that includes coining and hole punching 232 to form the apertures 60, 62, 60A, 62A and tapered outboard surfaces 275, 275A. The coining and hole punching operation 234 forms the apertures 60, 62, 60A, 62A along the channels 111, 113 of the strip section 183A at the upper and lower plate portions 4, 6. In one approach, punches are used to pierce the reduced thickness sections 52, 54, 52A, 54A of the strip section 183A in the channels 111, 113. The coining and hole punching operation 232 also forms the tapered surfaces 275, 275A into the walls 44, 45 and 44A, 45A, such as by supporting an underside of the strip section 183A and striking outboard ends of the walls 44, 45 and 44A, 45A with a coining die.

The strip section 183A is advanced in direction 202 to a separation operation 240 that removes the strip section 183A from the strip 183. The separation operation 240 forms the outboard end portions 30, 30A of the strip section 183A and produces the fastener body 2 shown in FIGS. 8 and 9 that may be used to assemble the fastener 1. The separation operation 240 may include a cutoff punch 242 for cutting the upper plate portion 4 of a downstream section of the strip 183 off from the lower plate portion 6 of the strip section 183A. The cutoff punch 242 also includes cutting the upper plate portion 4 of the strip section 183A off from the lower plate portion 6 of an upstream section of the strip 183. Taken together, the cutting at the lower plate portion 6 and the upper plate portion 4 of the strip section 183A separates the strip section 183A from the strip 183. As the strip 183 is continuously advanced in longitudinal direction 202, the cutoff punch 242 is repeatedly used to consecutively separate strip sections from the strip 183.

Using the cutoff punch 242 to separate the strip section 183A from the strip 183 may also form the U-shaped cutouts 259, 259A (see FIG. 8) in the outboard end portions 30, 30A of the fastener body 2. The cutoff punch 242 may include using a punch member shaped to produce the U-shaped cutout 259A in the lower plate portion 6 of the strip section 183A and the U-shaped cutout 259 in the upper plate portion 4. For example, a single cutoff punch 242 may first be used to cut off the upper plate portion 4 of a downstream section of the strip 183 from the lower plate portion 6 of the strip section 183A, the strip section 183A is advanced longitudinally in direction 202, and then the cutoff punch 242 is used to cut the upper plate portion 4 of the strip section 183A off from the lower plate portion 6 of an upstream section of the strip 183. As another example, two cutoff punches 242 may be used to substantially simultaneously cut off the lower plate portion 6 of the strip section 183A from the upper plate portion 4 of a downstream section of the strip 183 and cut off the upper plate portion 4 of the strip section 183A from the lower plate portion of the upstream strip section.

The method 200 includes an assembly operation 260 for assembling the fastener 1 from the fastener body 2 once the fastener body 2 has been produced from the strip section 183A by the operations 220, 230, and 240. The assembly operation 260 includes connecting 262 the wire 94 to the inner surface 12 of the upper plate portion 4 of the strip section 183A. The connecting 262 of the wire 94 to the upper plate portion 4 may occur prior to the cutoff punch 242 being used to separate the upper plate portion 4 of the strip section 183A from the lower plate portion 6 of the upstream section of the strip 183. This makes it easier to handle the fastener body 2 once the cutoff punch 242 separates the fastener body 2 from the strip 183. The assembly operation 260 may include welding several fastener bodies 2 cut from the strip 183 to the same wire 94. The several fastener bodies 2 on the wire 94 may be used to form a set of fasteners 1, like the set 1017 shown in FIG. 22. It will be appreciated that approaches besides the wire 94 may be used to maintain the fasteners 1 in a set. For example, a cardboard blank with openings that receive the staples 20, 22 may be used to maintain the fasteners 1 in a set.

With reference to FIG. 10, the one or more flat fastener bodies 2 connected 262 to the wire 94 are advanced to a loop forming operation 270 that includes bending 272 the loop portions 8A, 8B of each fastener body 2. The loop portions 8A, 8B are bent to reshape the flat fastener body 2 into the open configuration of FIG. 2 which positions the upper and lower plate portions 4, 6 in a spaced vertical relation therebetween. The bending 272 may include bending the loop portions 8A, 8B of one or more fastener bodies 2 at a time.

The one or more bent fastener bodies 2 connected to the wire 94 are then advanced to an attachment member connecting operation 280. In one form, the operation 280 includes inserting 282 the legs 24, 26 of the staples 20, 22 into the apertures 60, 62 of the upper plate portion 4 of each fastener body 2 to form a press-fit engagement between the legs 24, 26 and the upper plate portion 4. The assembled fasteners 1 are now ready for use as part of the splice 3 to secure the conveyor belt ends 5A, 5B.

Figure 11:
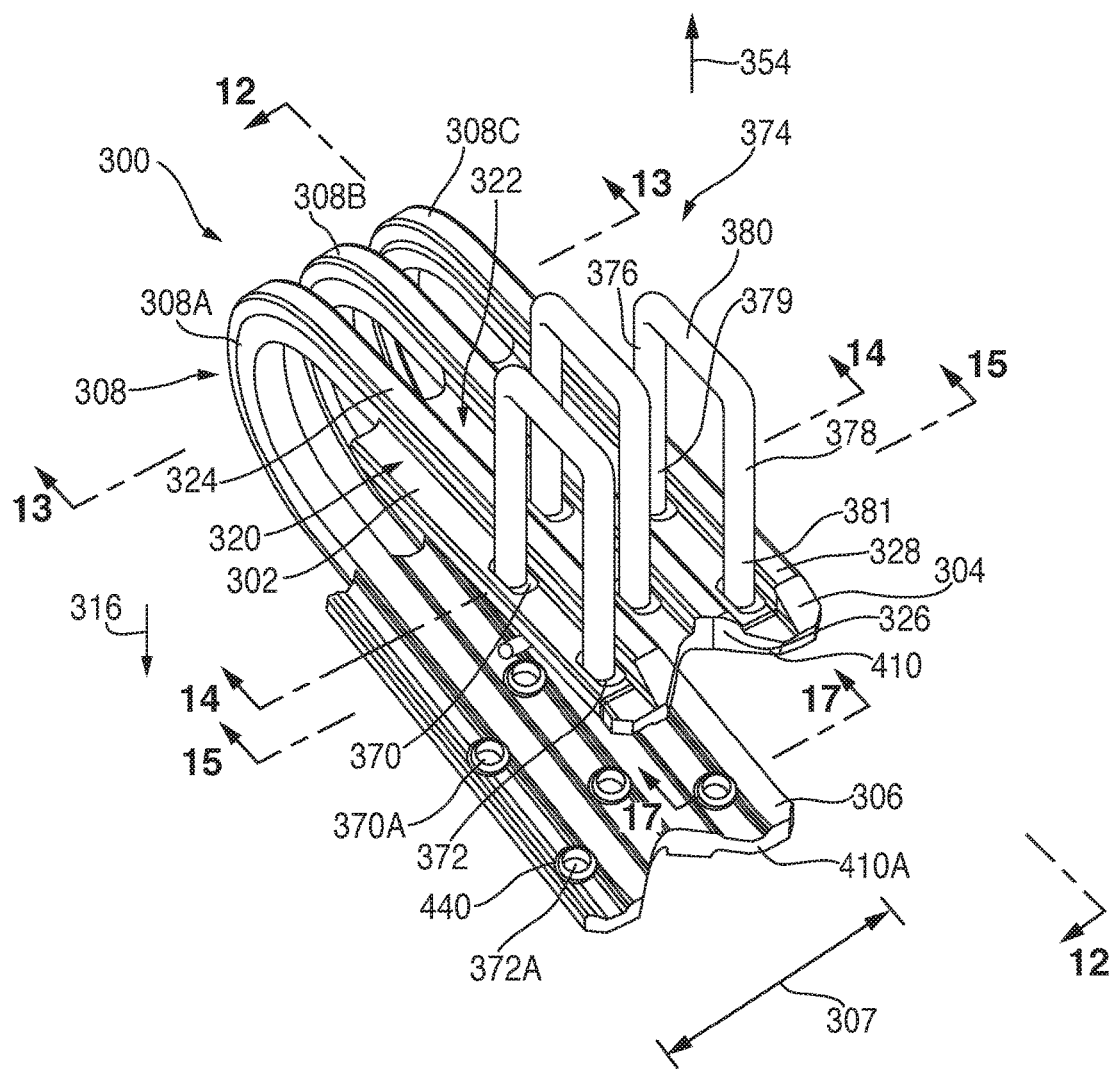
FIG. 11 is a perspective view of another fastener showing three staples preset on an upper plate portion of the fastener.

With reference to FIG. 11, another fastener 300 is provided having many advantages similar to the advantages of the fastener 1. It will be appreciated that the discussion below of features of the fastener 300 may be applicable to similar features of the fastener 1 and vice versa.

The fastener 300 includes a high-strength body 302 with upper and lower plate portions 304, 306 and loop portions 308 connecting the upper and lower plate portions 304, 306. The fastener body 302 may be formed from a strip 310 (see FIG. 18) of cold-worked material, such as cold-rolled or cold-drawn steel, having a uniform cross-section along its length 312. Like the fastener 10, the fastener 300 may have one or more attachment members, such as staples 374, preassembled on the upper plate portion 304 to increase the ease with which the fastener 300 may be secured to the conveyor belt ends 5A, 5B.

Figure 14:
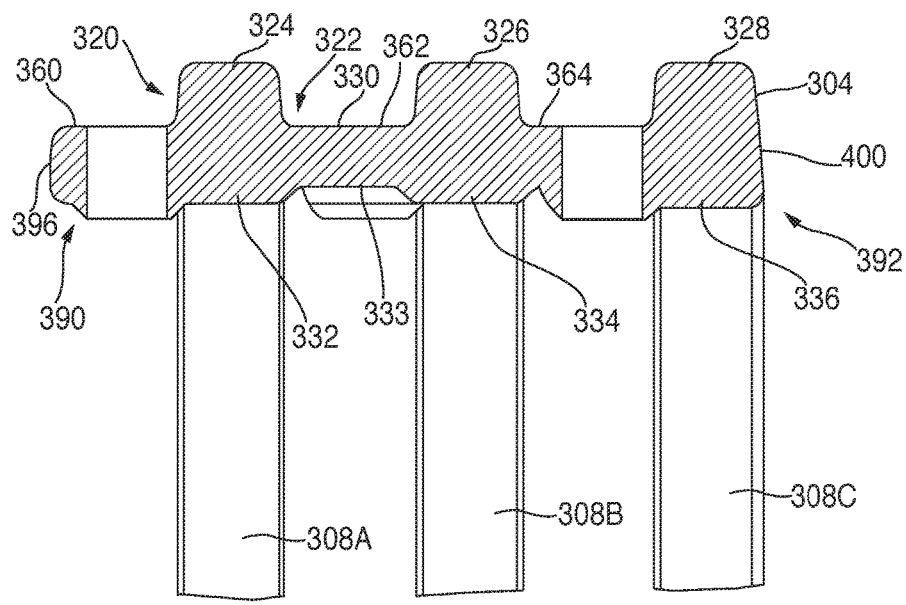
FIG. 14 is a cross-sectional view of the upper plate portion taken across line 14-14 in FIG. 11 showing apertures of the upper plate portion sized to receive legs of the staples.
Figure 15:
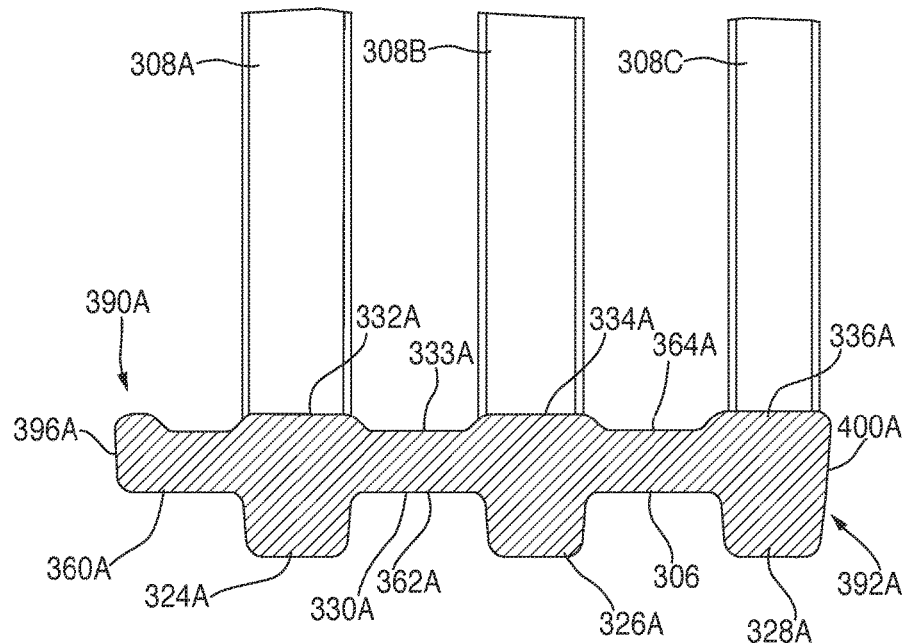
FIG. 15 is cross-sectional view of a lower plate portion of the fastener taken across line 15-15 in FIG. 11 showing ribs extending inwardly from an inner surface of the lower plate portion that are vertically aligned with walls extending outwardly from an outer surface of the lower plate portion.

The fastener body 302 has beam portions 320 extending longitudinally between outboard end portions 410, 410A of the body 302 and web portions 322 extending laterally from the beam portions 320. With reference to FIGS. 11 and 15, the beam portions 320 include walls 324, 326, 328 extending outwardly from an outer surface 330 of the upper plate portion 304 and walls 324A, 326A, 328A extending outwardly from an outer surface 330A of the lower plate portion 306. The beam portions 320 further include ribs 332, 334, 336 extending inwardly from an inner surface 333 of the upper plate portion 304 and ribs 332A, 334A, 336A extending inwardly from an inner surface 333A of the lower plate portion 306. As can be seen in FIG. 14, the inner ribs 332, 334, 336 of the upper plate portion 304 are vertically aligned with the outer walls 324, 326, 328. Similarly, the inner ribs 332A, 334A, 336A of the lower plate portion 306 of the fastener 300 are vertically aligned with the walls 324A, 326A, 328A.

The web portions 322 include reduced thickness plate sections 360, 362, 364, 360A, 362A, 364A extending laterally from the aligned walls 324, 326, 328, 324A, 326A, 328A and ribs 332, 334, 336, 332A, 334A, 336A. The reduced thickness plate sections 360, 362, 364, 360A, 362A, 364A have apertures 370, 372, 370A, 372A formed therein for receiving staples 374 as discussed in detail below. With reference to FIGS. 14 and 15, the reduced thickness plate sections 360, 362, 364, 360A, 362A, 364A have predetermined thicknesses that are substantially constant laterally across and longitudinally along the upper and lower plate portions 304, 306.

Figure 12:
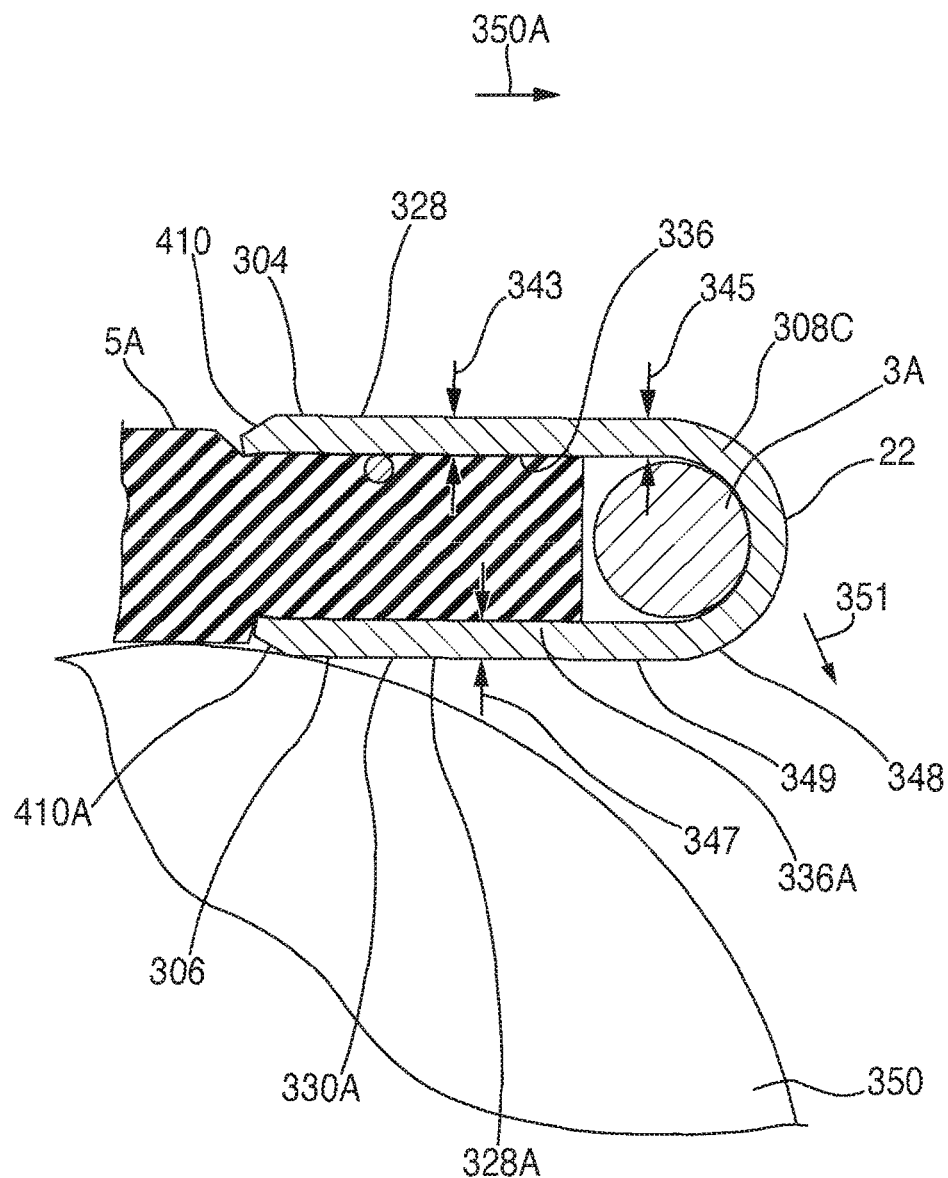
FIG. 12 is a cross-sectional view of the fastener taken across line 12-12 in FIG. 11 showing the fastener secured to a conveyor belt end that is being pulled around a head pulley of the conveyor belt.
Figure 13:
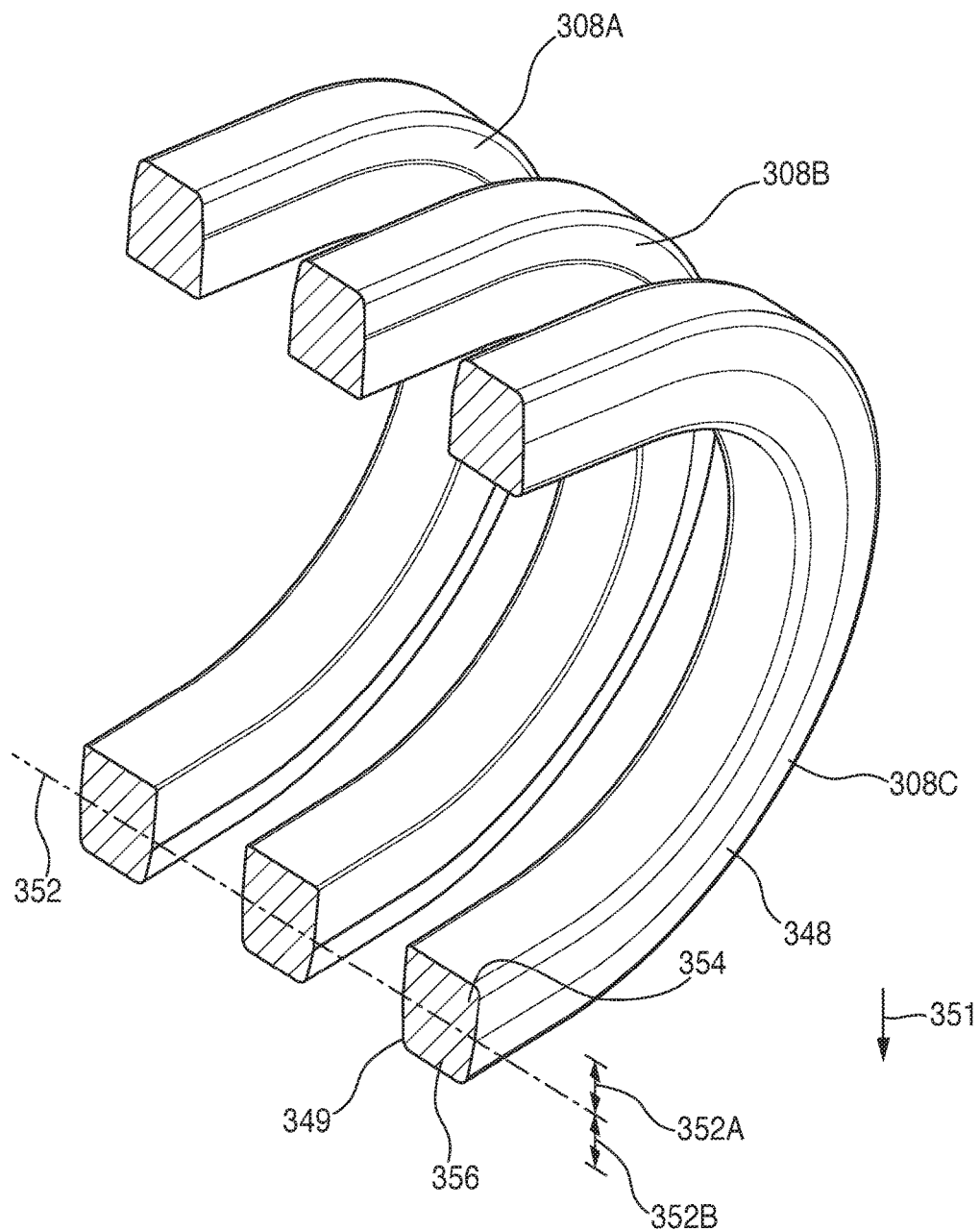
FIG. 13 is a cross-sectional view of the fastener taken across line 13-13 in FIG. 11 showing a cross-section of base sections of the fastener loop portions and a neutral axis of the base sections as the fastener is pulled around the head pulley of FIG. 12.

The beam portions 320 include the loop portions 308 with three loop portions 308A, 308B, 308C connecting the upper and lower plate portions 304, 306. The loop portions 308A, 308B, 308C are longitudinally aligned with the walls 324, 326, 328, 324A, 326A, 328A and ribs 332, 334, 336, 332A, 334A, 336A. This enhances the durability of the fastener body 302 by providing a uniform thickness throughout the beam portions 320 and limiting changes in thickness at the connections between the loop portions 308 and the upper and lower plate portions 304, 306 which could operate as stress risers. With reference to FIGS. 12 and 13, the fastener 300 is shown secured to conveyor belt end 5A with the loop portions 308 extending about the hinge pin 2A as the conveyor belt end 5A travels around a head pulley 350 of the conveyor belt 3 (the opposite conveyor belt end 5B and fastener 300 thereon is omitted for clarity). The aligned wall 328 and rib 336 of the upper plate 304 has a thickness 343, the loop section 308C has a thickness 345, and the aligned wall 328A and rib 336A has a thickness 347. The thicknesses 343, 345, and 347 are substantially similar and continuous along the beam portion 320 from one outboard end portion 410 of the fastener body 302 to the other outboard end portion 410A. The thick beam portions 320 thereby provide durable load bearing members for withstanding loading from conveyor belt operations without requiring that the loop portions 308 be built up with a separate manufacturing process as in some conventional processes.

With reference to FIG. 12, the loop portions 308 of the fastener 300 tend to experience their highest internal stresses as the conveyor belt end 5A travels around the head pulley 350 in direction 350A. The head pulley 350 supports the outer surface 330A of the lower plate portion 306 and the hinge pin 2A pulls generally downward in direction 351 as the conveyor belt ends 5A, 5B travel around the head pulley 350. Because the lower plate portion 306 is supported on the head pulley 350, the pulling of the hinge pin 22 in direction 351 applies a downward force on curved section 348 of the loop portions 308 which attempts to bend base sections 349 of the loop portions 308 about the head pulley 350. However, the loop portions 308 are continuous with and have the same thickness 345 as the thicknesses 343, 347 of the aligned walls 324, 326, 328, 324A, 326A, 328A and ribs 332, 334, 336, 332A, 334A, 336A which strengthens the base sections 349 of the loop portions 308 against bending.

With reference to FIG. 11, the aligned walls 324, 326, 328, 324A, 326A, 328A; ribs 332, 334, 336, 332A, 334A, 336A; and loop portions 308A, 308B, 308C form the three uniformly thick load bearing beam portions 320 of the fastener body 302 extending from one outboard end portion 410 to the other 410A. With respect to FIG. 13, the beam portions 320 have a relatively large area moment of inertia at the loop portions 308A, 308B, 308C and about a neutral axis 352 as the hinge pin 3A pulls in direction 351 on the curved section 348 of the loop portions 308A, 308B, 308C. The neutral axis 352 is used to provide a non-limiting example of the position of the neutral axis 352 during conveyor belt operations. It will be appreciated that the loading experienced by the loop portions 308 during conveyor belt operations may be quite complex and this discussion is intended to provide a basic understanding of some advantages of the fastener body 302.

More specifically, the loop portion 308C has a cross-section with an inner region 354 extending vertically above the neutral axis 352 by distance 352A that is commensurate with the thickness of the inner rib 336A on the lower plate portion 306. The loop portion 308C also has an outer region 356 of the cross-section thereof extending vertically below the neutral axis 352 a distance 352B that is commensurate with the thickness of the outer wall 328A. By vertically aligning the inner rib 336A and the outer wall 328A, the vertical distances 352A, 352B that the regions 354, 356 of the loop cross-sections extend above and below the neutral axis 352 can be maximized. This, in turn, increases the area moment of inertia of the loop portion 308C which increases the strength of the base section 349 of the loop portion 308C against bending about the conveyor belt head pulley 350. The base sections 349 of the other loop portions 308A, 308B are also stronger due to the increased area moment of inertia from the aligned ribs 332A, 334A and walls 324A, 326A. By strengthening the base section 349 of each of the loop portions 308, the fastener body 302 is more durable and better able to resist loading from travel around the head pulley 350.

With reference to FIGS. 11, 14 and 15, each reduced thickness plate section 360, 362, 364, 360A, 362A, 364A has a pair of apertures 370, 372 or 370A, 372A formed therein to receive legs 376, 378 of the staples 374 press-fit therein. The staples 374 include bights 380 connecting the legs 376, 378 that seat against the upper plate outer surface 330 when the staples 374 are driven into the conveyor belt ends 14, 16. The walls 324, 326, 328 of the upper plate portion 304 protect the staple bights 380 once the staple legs 376, 378 have been driven into the conveyor belt. Further, the walls 324A, 326A, 328A of the lower plate portion 306 (see FIG. 15) extend along and protect ends 379, 381 of the staple legs 376, 378 after the ends 379, 381 have been bent against the outer surface 330A of the lower plate portion 306.

Figure 18:
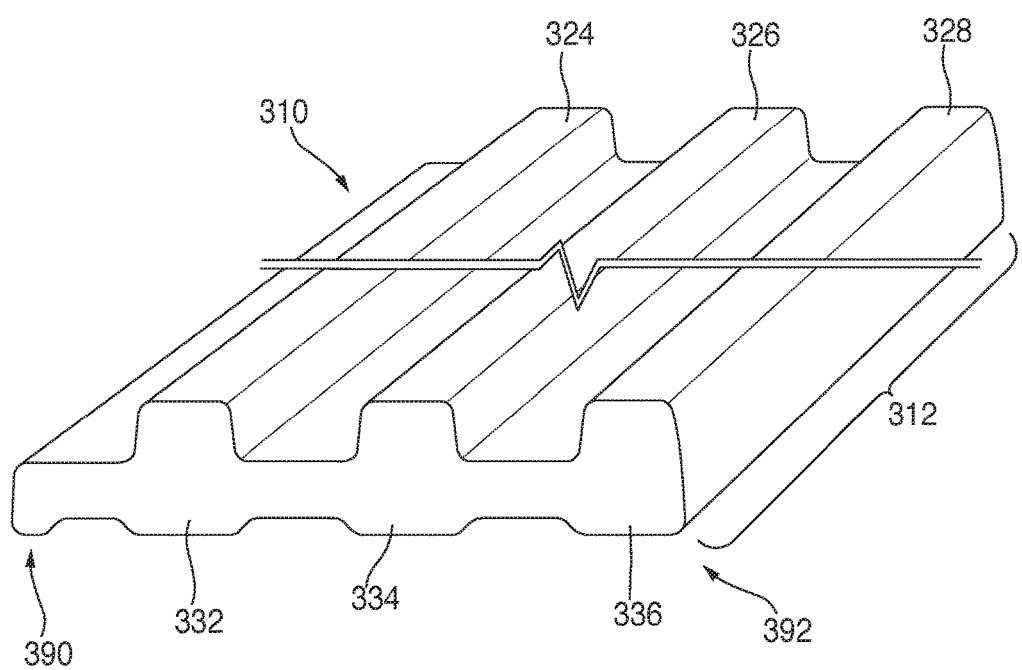
FIG. 18 is a perspective view of a strip of material from which a body of the fastener of FIG. 11 is manufactured showing the vertically aligned walls and ribs already formed in the strip of material.

The upper and lower plate portions 304, 306 each have a pair of opposite, outer lateral portions 390, 392 or 390A, 392A (see FIGS. 14 and 15) that accommodate pivoting of nearby fasteners 300 during troughing of the conveyor belt 16. The pairs of lateral portions 390, 390A and 392, 392A match due to the fastener body 302 (and upper and lower plate portions 304, 306 thereof) being made from the strip 310 which includes the outer lateral portions 390, 392 previously formed therein as shown in FIG. 18. More specifically, the outer lateral portion 390 of the upper plate portion 304 matches the lateral portion 390A of the lower plate portion 306 and the lateral portion 392 of the upper plate portion 304 matches the lateral portion 392A of the lower plate portion 306.

Figure 16:
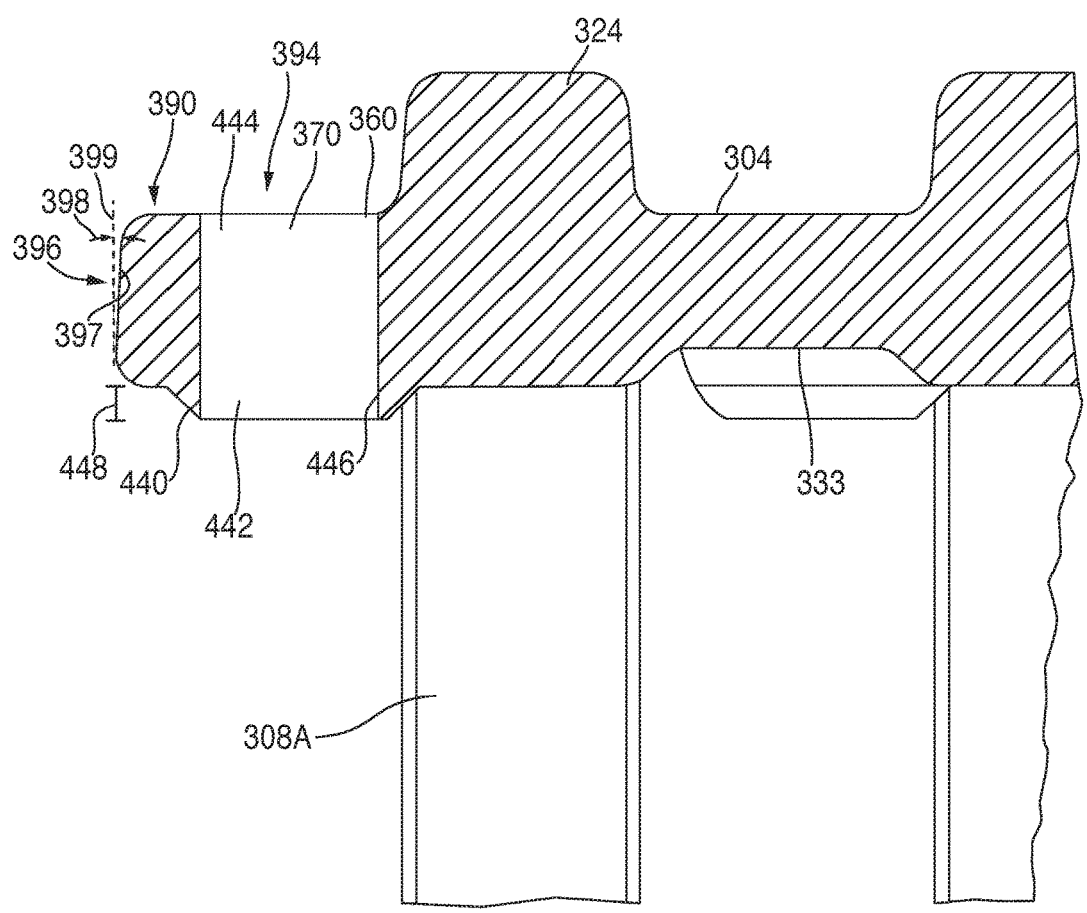
FIG. 16 is an enlarged portion of FIG. 14 showing a vertical surface of the upper plate portion at one lateral side thereof having a contour that tapers inwardly to provide clearance for a lateral side of a nearby fastener along the conveyor belt end.

With reference to FIG. 16, the outer lateral portion 390 will be discussed with respect to the upper plate portion 304. The reduced thickness section 360 includes a ledge portion 394 having the apertures 370, 372 formed therein. The lateral portion 390 includes a vertical surface 396 with a straight portion 397 inclined at an angle 398 relative to a vertical axis 399. The axis 399 is generally orthogonal to the inner surface 333 of the upper plate portion 304. The angle 398 is in the range of approximately two degrees to approximately fifteen degrees, such as approximately three degrees. The straight surface portion 397 tapers inwardly to provide clearance for a vertical surface 400 (see FIG. 17) of a nearby fastener 300 upon toughing of the conveyor belt 16.

Figure 17:
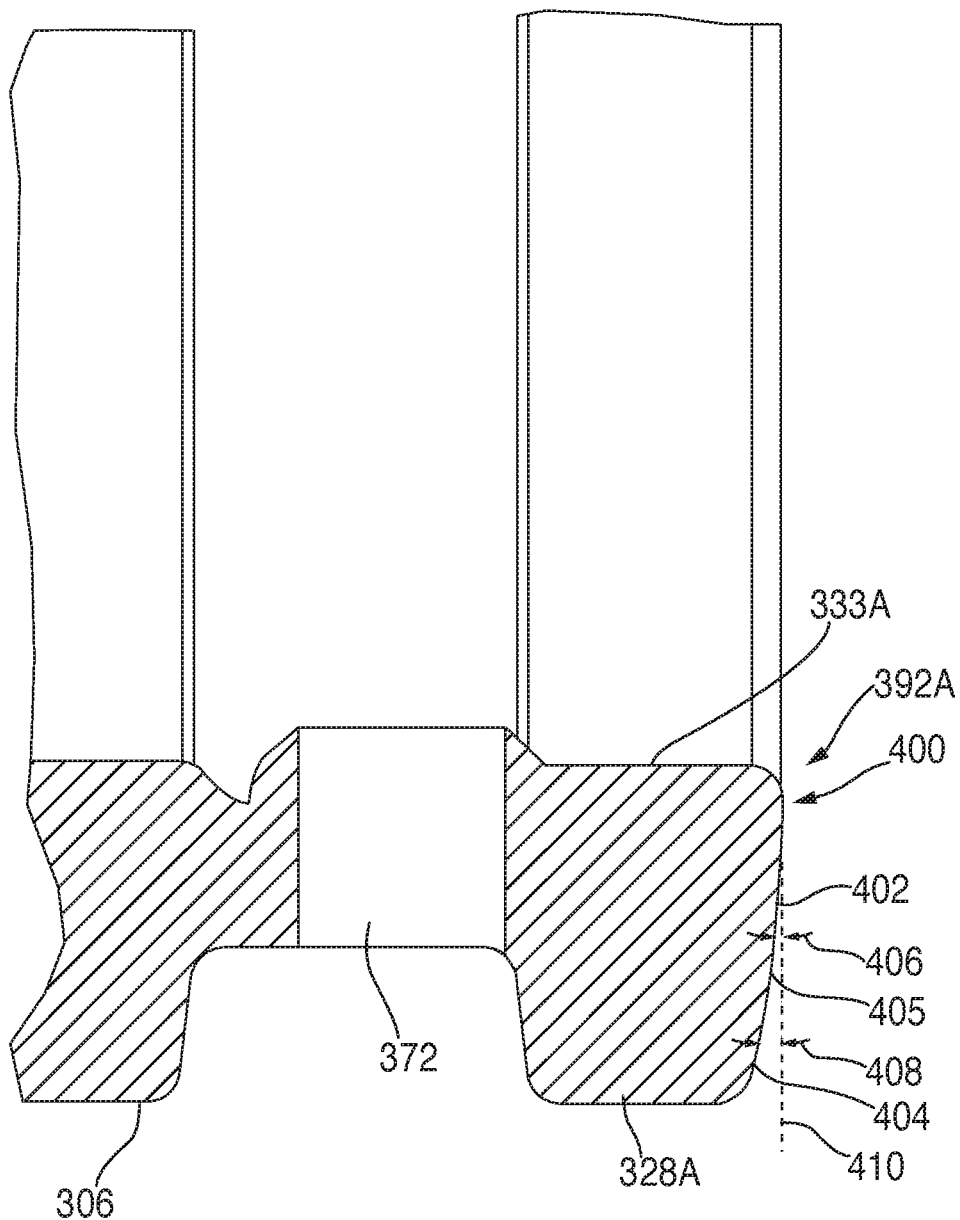
FIG. 17 is a cross-sectional view taken across line 17-17 in FIG. 11 showing a vertical surface of the lower plate portion at the other lateral side of the fastener having differently tapered inner and outer portions of the vertical surface.

With reference to FIG. 17, the outer lateral portion 392A will be discussed with respect to the lower plate portion 306. The wall 328A includes the vertical surface 400 having an inner portion 402 and an outer portion 404 extending at different angles 406, 408 relative to an axis 410 generally orthogonal to the lower plate inner surface 333A. The vertical surface 400 may further include a junction 405 between the inner and outer portions 402, 404. In one form, the angle 406 is in the range of approximately two degrees to approximately fifteen degrees, such as approximately three degrees and the angle 408 is in the range of approximately two degrees to approximately fifteen degrees, such as approximately six degrees. By utilizing a compound contour of the vertical surface 400, the outer lateral portions 392, 392A can provide varying clearances relative to the outer lateral portions 390, 390A of a nearby fastener 300. More specifically, because the outer vertical surface portion 404 extends at a greater angle than the inner vertical surface portion 402, the outer vertical surface portion 404 provides additional clearance for the vertical surfaces 396, 396A of a nearby fastener 300 as the incline between the vertical surfaces 396, 400 or 396A, 400A increases due to more pronounced troughing of the conveyor belt 16 (like the fasteners 1010A, 1010B discussed below with respect to FIG. 33).

With reference to FIG. 19, the fastener body 302 is shown prior to the loop portions 308A, 308B, 308C being bent to position the upper and lower plate portions 304, 306 in the spaced vertical relationship shown in FIG. 11. The upper and lower plate portions 304, 306 include outboard end portions 410, 410A with coined leading surfaces 414, 416, 418 formed into the walls 324, 326, 328 of the upper plate portion 302 and coined leading surfaces 414A, 416A, 418A formed in the walls 324A, 326A, 328A.

As discussed above, the walls 324, 326, 328, 324A, 326A, 328A protect the staple bights 380 and the leg ends 379, 381 once the staples 374 have been driven into the conveyor belt end 5A, 5B. Additionally, the apertures 370, 372 and 370A, 370A are positioned on the upper and lower plate portions 304, 306 to position the apertures 370, 372 and 370A, 372A on the ledge portions 394, 394A as far laterally inward as possible while maximizing the spacing between the staples 374 in the conveyor belt ends 5A, 5B. Specifically, the apertures 370, 372 and 370A, 372A in the ledge portions 394, 394A are located near the base of the walls 324, 324A which maximizes the distance of the apertures 370, 372 and 370A, 372A in the ledge portions 394, 394A laterally inward from the outer vertical surfaces 396, 396A (see FIG. 16). This moves the staple bight 380 and leg ends 376, 378 received on the ledge portions 394, 394A laterally inward away from the walls 328, 328A of nearby fasteners 300 to protect the staple 374 on the ledge portions 394, 394A.

The upper and lower plate portions 304, 306 laterally space the staples 374 evenly across the conveyor belt end 5A, 5B to maximize the distance between the staples 374 and maximize the size of the conveyor belt section between the staples 374 which increases pull-through resistance of the fastener 300. To space the staples 374 evenly across upper and lower plate portions 304, 306 while positioning the staples 374 received on the ledge portions 390, 390A laterally inward from the outer vertical surfaces 396, 396A, the apertures 370, 372 and 370A, 372A formed in the reduced thickness sections 362, 362A and 364, 364A are formed at the base of their respective walls 326, 326A and 328, 328A. This positions the staple bight 380 and leg ends 376, 378 received in the reduced thickness sections 362, 362A at the walls 326, 326A and the staple bight 380 and leg ends 376, 378 received in the reduced thickness sections 364, 364A at the walls 328, 328A. The staples 374 are all thereby laterally spaced evenly across the upper and lower plate portions 304, 306 to maximize the distance therebetween and the staple 374 received on the ledge portions 394, 394A is laterally recessed from the nearby fastener 300.

With reference to FIG. 20, the upper and lower plate portions 304, 306 have inner surfaces 420, 420A with the ribs 332, 334, 336 and 332A, 334A, 336A extending inwardly (out of the page in FIG. 11) from the inner surfaces 420, 420A. In contrast to the fastener body 1024 of FIG. 35, the fastener body 302 shown in FIG. 20 has ribs 332, 334, 336 and 332A, 334A, 336A longitudinally aligned with the loop portions 308A, 308B, 308C. This positions the apertures 370, 372 and 370A, 372A out of the longitudinal load path of the aligned walls 324, 326, 328, 324A, 326A, 328A, ribs 332, 334, 336, 332A, 334A, 336A and loop portions 308A, 308B, 308C.

Returning to FIG. 11, the upper and lower plate portions 304, 306 have a narrow width 307 in the range of approximately 0.8 inches to approximately 0.9 inches, such as about 0.84 inches. The width 307 is sufficiently narrow to allow the upper and lower plate portions 304, 306 to sink into the conveyor belt end 5A, 5B when clamped thereto. At the same time, the width 307 is sized to accommodate the three staples 374 mounted on the upper plate portion 304. The upper and lower plate portions 304, 306 thereby provide strong clamping via the sinking of the plate portions 304, 306 into the conveyor belt end 12, 14 and secure attachment of the plate portions 304, 306 to the conveyor belt end 5A, 5B via the three staples 374.

With reference to FIGS. 11 and 16, the upper and lower plate portions 304, 306 have aperture surfaces 442 that define the apertures 370, 372 and 370A, 372A and are configured to form a press fit engagement with a corresponding staple leg 376, 378 received therein. The upper and lower plate portions 304, 306 also have collars 440 extending about each of the apertures 370, 372 and 370A, 372A. The apertures 370, 372, 370A, 372A may be formed by punching the upper and lower plate portions 304, 306 and the collar 440 may be formed by extruding material of the upper and lower plate portions 304, 306 inward toward the inner surfaces 333, 333A during the aperture punching operation. The apertures surfaces 442 each have an outer portion 444 and an inner, collar portion 446. The collar portion 446 provide an additional region of engagement 448 between the aperture surface 442 and the staple legs 376, 378 at apertures 370, 372 of the upper plate portion 304 which strengthens the connection between the staple legs 376, 378 and the upper plate portion 304 before the staple 374 is driven into the conveyor belt 16. Further, the additional region of engagement 446 provided by the collar portions 446 at the apertures 370A, 372A of the lower plate portion 306 strengthens the connection between the staple legs 376, 378 and the lower plate portion 306 once the staple 374 has been driven into the conveyor belt 16 and the staple leg ends 379, 381 bent against the outer surface 330A of the lower plate portion 306.

With reference to FIGS. 21 and 22, fasteners 1010 of a conveyor belt splice 1011 are provided for joining ends 1012, 1014 of a conveyor belt 1016 together. The fasteners 1010 may be provided as a set 1017 of side-by-side fasteners 1010 and secured on a wire 1019 for ease of positioning the set of fasteners 1017 on one of the ends 1012, 1014 of the conveyor belt 1016. The fastener 1010 has many advantages similar to the advantages of the fasteners 1 and 300 discussed above. It will be appreciated that features discussed with respect to fastener 1010 may be applicable to the features of the fasteners 1, 300 and vice versa.

The fasteners 1010 have loop portions 1020 for extending around a hinge pin 1022 of the splice 1011 and being intermeshed with loop portions 1020 of fasteners 1010 on the opposite end 1012, 1014 of the conveyor belt 1016. Each fastener 1010 has a body 1024 with upper and lower plate portions 1030, 1032 for clamping one of the conveyor belt ends 1012, 1014 therebetween. The loop portions 1020 have an arcuate configuration to extend around the hinge pin 1022 and connect the upper and lower plate portions 1030, 1032. The body 1024 may be manufactured from an elongate strip 1200 (see FIG. 38) of cold-formed stock material, such as cold-rolled or cold-drawn steel, such that the body 1024 is very rigid and durable. Because the body 1024 and loop portions 1020 thereof are made from cold-rolled or cold-drawn material, the loop portions 1020 are very thick and durable without requiring additional processing or separate manufacturing steps to build up the loop thickness.

With reference to FIGS. 23, 27, and 28, the fastener body 1024 has a varying cross-section in a lateral direction across the upper and lower plate portions 1030, 1032 including a variable thickness of the upper and lower plate portions 1030, 1032 extending between outer and inner surfaces 1050, 1054 and 1050A, 1054A thereof. The variable cross-section of the fastener body 1024 includes thicker, beam portions 1040 extending longitudinally between outboard end portions 1090, 1090A (see FIG. 34) and reduced thickness web portions 1042, 1042A extending laterally from the beam portions 1040 at the upper and lower plate portions 1030, 1032. The beam portions 1040 include upper and lower portions 1039, 1039A (see FIG. 25) at the upper and lower plate portions 1030, 1032 and the beam portions 1040 further include the loop portions 1020 intermediate the upper and lower portions 1039, 1039A. The beam portions 1040 each have a cross-section taken laterally thereacross that is substantially uniform for the length of the beam portion 1040 between the outboard end portions 1090, 1090A of the body 1024. As shown in FIG. 25, the beam portions 1040 also have a substantially constant thickness 1041 (see FIG. 25) throughout including the loop portions 1020 and the upper and lower plate portions 1039, 1039A such that the beam portions 1040 provide a rigid construct to resist loading during conveyor belt operations.

With reference to FIGS. 23 and 27, the upper portions 1039 of the beam portions 1040 include raised walls 1044, 1046, 1048 and the web portions 1042 include plate sections 1051, 1052, 1053 with pairs of apertures 1069, 1071 formed in the plate sections 1051, 1052, 1053. The plate sections 1051, 1052, 1053 have a reduced thickness relative to the upper plate portion 1030 at the raised walls 1044, 1046, 1048. The plate sections 1051, 1052, 1053 are of substantially constant thickness longitudinally along the upper plate portion 1030. It is intended that this substantially constant thickness encompass localized deviations within the plate sections 1051, 1052, 1053 around the apertures 1069, 1071 formed in the plate sections 1051, 1052, 1053. At the lower portions 1039A, the beam portions 1040 have raised walls 1044A, 1046A, 1048A thereof and the web portions 1042 include plate sections 1051A, 1052A, 1053A extending laterally between the walls 1044A, 1046A, 1048A with apertures 1069A, 1071A formed in the plate sections 1051A, 1052A, 1053A.

The upper plate portion 1030 has one or more attachment members preassembled thereto, such as rivets or staples 1070, configured to be readily driven into the conveyor belt end 1012, 1014 and secure the fastener 1010 thereto. The staples 1070 have a bight 1072 and depending legs 1074, 1076 press-fit into pairs of apertures 1069, 1071 in the plate sections 1051, 1052, 1053 between the raised walls 1044, 1046, 1048. Driving the staples 1070 into one of the conveyor belt ends 1012, 1014 seats the staple bights 1072 against the plate sections 1051, 1052, 1053 between the raised walls 1044, 1046, 1048. Because the raised walls 1044, 1046, 1048 extend longitudinally along opposite sides of the staple bights 1072, the raised walls 1044, 1046, 1048 protect the staple bight 1072 during conveyor belt operation. For example, the raised walls 1044, 1046, 1048 reduce the likelihood of conveyed material or a conveyor belt scraper blade damaging or becoming caught on the staple bight 1072. With reference to FIGS. 23 and 27, the raised walls 1044, 1046, 1048 may extend vertically outward from the upper plate outer surface 1050 a distance greater than the thickness of the staple bight 1072. This makes the raised walls 1044, 1046, 1048 taller than the staple bights 1072 such that a conveyor belt scraper will impact the raised walls 1044, 1046, 1048 rather than the staple bights 1072 thereby reducing the wear and tear on the staple bights 1072. Similarly, the raised walls 1044A, 1046A, 1048A of the lower plate portion 1032 may extend outward a distance greater than staple leg ends 1080, 1082 such that a conveyor pulley or idler will impact the raised walls 1044A, 1046A, 1048A rather than the staple ends 1080, 1082.

With reference to FIGS. 22 and 23, the apertures 1069, 1071 in the plate sections 1051, 1052, 1053 of the upper plate portion 1030 are aligned with apertures 1069A, 1071A in plate sections 1051A, 1052A, 1053A of the lower plate portion 1032. Driving the staples 1070 into the conveyor belt end 1012, 1014 causes the staple legs 1074, 1076 to travel through the apertures 1069, 1071 of the upper plate portion 30, through the conveyor belt ends 1012, 1014, and through the apertures 1069A, 1071A of the lower plate portion 1032. With reference to FIG. 26, the ends 1080, 1082 of the staple legs 1074, 1076 may be bent against the outer surface 1050A of the lower plate portion 1052 to fix the staples 1070 to the upper and lower plate portions 1030, 1032. The bight 1072 of the staples 1070 are received in channels 1073 (see FIG. 27) between the raised walls 1044, 1046, 1048 and the ends 1080, 1082 of the staple legs 1074, 1076 are received in channels 1073A (see FIG. 28) between the raised walls 1044A, 1046A, 1048A of the lower plate portion 1032. Thus, the raised walls 1044, 1046, 1048 of the upper plate portion 1030 extend longitudinally along the staple bights 1072 and protect the staple bights 1072 while the raised walls 1044A, 1046A, 1048A of the lower plate portion 1032 extend longitudinally along the staple leg ends 1080, 1082 and protect the staple leg ends 1080, 1082.

With reference to FIGS. 27 and 28, the upper and lower plate portions 1030, 1032 have inner raised ribs 1056, 1058, 1060 and 1056A, 1058A, 1060A laterally offset from the outer raised walls 1044, 1046, 1048 and 1044A, 1046A, 1048A across the upper and lower plate portions 1030, 1032. The ribs 1056, 1058, 1060 and 1056A, 1058A, 1060A bite into the conveyor belt end 1012, 1014 for increased gripping strength when the upper and lower plate portions 1030, 1032 are clamped to the belt end 1012, 1014.

Because the staple body 1024 and upper and lower plate portions 1030, 1032 thereof is manufactured from the elongate strip 1200 having the outer raised walls 1044, 1046, 1048 and inner raised ribs 1056, 1058, 1060 already formed therein (see FIG. 38), the upper and lower plate portions 1030, 1032 do not have to be bent or deformed to produce a cross-section that protects the staple bights 1072 and leg ends 1080, 1082 unlike some prior fasteners. For convenience purposes, the walls and ribs of the strip 1200 will be identified using numerals 1044, 1046, 1048 and 1056, 1058, 1060 similar to the numbering used to identify the walls and ribs of the upper plate portion 30. However, it will be appreciated that the outer walls 1044A, 1046A, 1048A and the inner ribs 1056A, 1058A, 1060A on the lower plate portion 1032 have the same shape and size as the corresponding outer walls 1044, 1046, 1048 and inner ribs 1056, 1058, 1060 of the upper plate portion 1030 because the upper and lower plate portions 1030, 1032 are formed from the same strip 1200.

With reference to FIGS. 22 and 24, the upper and lower plates 1030, 1032 have outboard end portions 1090, 1090A with generally V-shaped cutouts 1092, 1092A and tapered portions, such as coined leading surfaces 1094, 1094A. The coined leading surfaces 1094, 1094A are formed into outboard ends of the walls 1044, 1046, 1048 (or walls 1044A, 1046A, 1048A) and operate, for example, as a wedge to engage and lift a conveyor belt scraper blade away from the upper plate portion 1030 or move the lower plate portion 1032 over a conveyor pulley or idler. Further, the tapered profile of the coined leading surfaces 1094, 1094A provides a smaller profile of the outboard end portions 1090, 1090A of the upper and lower plate portions 1030, 1032. The smaller profile reduces the impact from, for example, a conveyor belt scraper blade striking the fastener upper plate portion 1030 each time the fastener 1010 passes by the scraper blade.

With reference to FIGS. 22 and 23, the staples 1070 include a pair of outer staples 1070A, 1070B and an inner staple 1070C that are unevenly longitudinally spaced from an inboard end 1091 of the upper and lower plate portions 1030, 1032 such that the staples 1070A, 1070B, 1070C are longitudinally offset with respect to each other. More specifically, the legs 1074, 1076 of the two outer staples 1070A, 1070B are spaced farther from the inboard end 1091 and closer toward the outboard end portions 1090, 1090A than the legs 1074, 1076 of the middle staple 1070C, as shown in FIG. 24. By having the outer staples 1070A, 1070B positioned farther from the inboard edge 1091 (see FIG. 23) of the upper and lower plate portions 1030 and 1032, the outer staples 1070A, 1070B provide increased reach-back of the staples 1070A, 1070B in the conveyor belt end 1012, 1014. In addition to providing improved reach-back, the longitudinally staggered positioning of the staples 1070A, 1070B, 1070C avoids a straight-line pattern of staple penetrations across the belt end 1012, 1014 which may provide, in some applications, an improved resistance to pull-through of the staples 1070A, 1070B, 1070C from the conveyor belt end 1012, 1014.

With reference to FIGS. 22 and 23, the legs 1074, 1076 of the staples 1070 may be press-fit into the apertures 1069, 1071 in the plate sections 1051, 1052, 1053 of the upper plate portion 1030. Once the fastener 1010 is positioned on the conveyor belt end 1012, 1014, the staple legs 1074, 1076 may be driven through the conveyor belt end 1012, 1014 and into the lower plate apertures 1069A, 1071A such that the staple legs 1074, 1076 extend through the aligned apertures 1069, 1069A and 1071, 1071A as shown in FIGS. 26 and 29.

Figure 30:
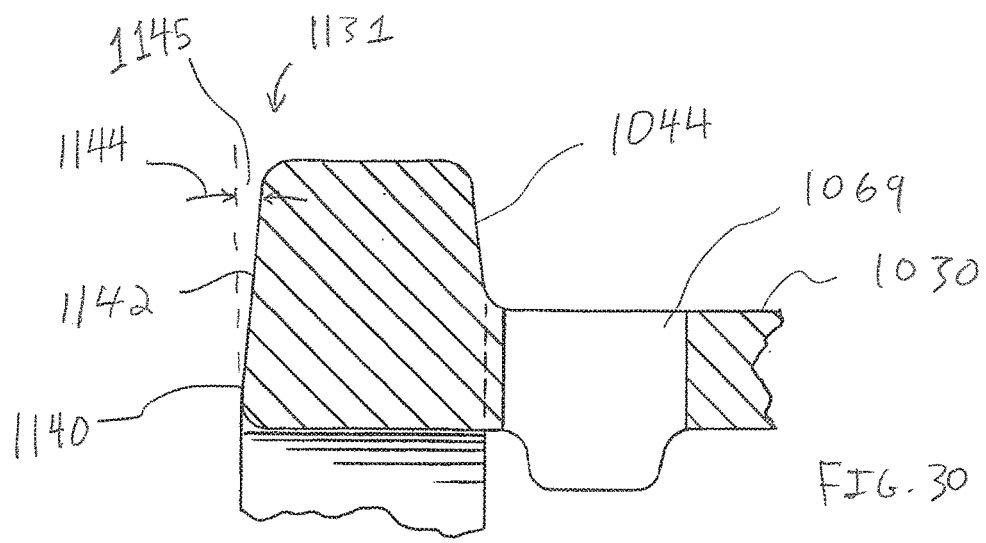
FIG. 30 is an enlarged view of a portion of FIG. 27 showing a vertical surface at one lateral side of the upper plate portion.
Figure 31:
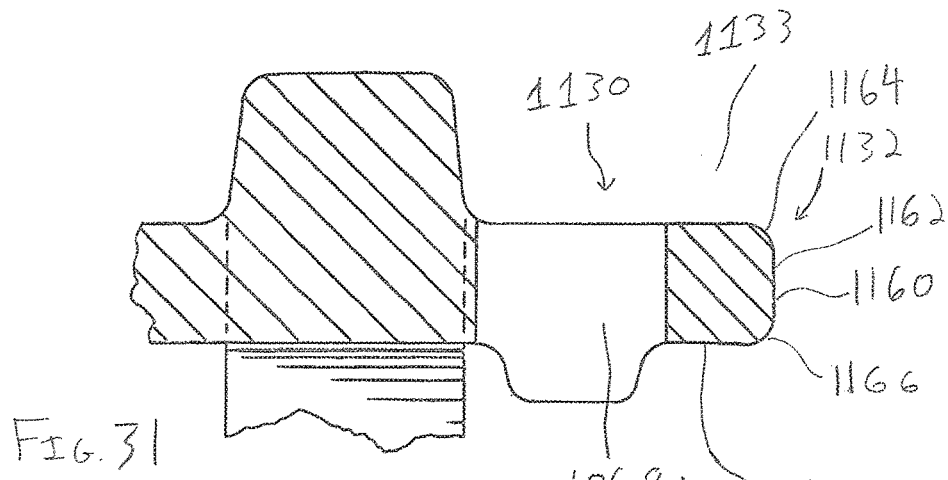
FIG. 31 is an enlarged view of a portion of FIG. 27 showing a vertical surface of the upper plate portion at the opposite lateral side of the upper plate portion.

Another advantage of the fastener 1010 is that the upper and lower plate portions 1030, 1032 have complimentary lateral sides that permit relative movement of nearby fasteners 1010 while protecting the outer staples 1070B of the fasteners 1010. With reference to FIGS. 27, 28, 30, and 31, the fastener upper and lower plate portions 1030, 1032 each have a pair of opposite lateral sides 1120, 1122 and 1120A, 1122A. With reference to FIGS. 30 and 31, the upper plate portion 1030 has outer lateral portions 1131, 1132 at its outer sides 1120, 1122 with respective contours that permit the outer lateral portions 1131, 1132 to be tightly positioned or in engagement with the upper plate portion 1030 of nearby fasteners 1010. The lower plate portions 1032 of the fasteners 1010A, 1010B, 1010C likewise have outer lateral portions 1131A, 1132A (see FIG. 28) with contours that permit the outer lateral portions 1131A, 1132A to be tightly positioned or in engagement with the lower plate portion 1032 of nearby fasteners 1010.

With reference to FIG. 36, the fasteners 1010A, 1010B, 101C, and 1010D are secured to the conveyor belt end 1012 and have loop portions 1020 extending about the hinge pin 1022 of the conveyor belt splice 1011 (see FIG. 21). During conveyor belt operation, the conveyor belt 1016 may have a trough-shape due to the weight of conveyed materials and may be supported by rollers 1135 as shown in FIG. 37. With reference to FIG. 33, as the conveyor belt 1016 troughs, the fasteners 1010A, 1010B pivot to positions 1010A' and 1010B' shown in dashed lines in FIG. 33. If the contoured lateral portions 1131, 1132 are in contact with each other, the contours of the lateral portions 1131, 1132 provide a bearing interface 1134 that permits relative movement of the lateral portions 1131, 1132 against each other. Because the fastener body 1024 and upper and lower plate portions 1030, 1032 thereof are manufactured from the elongate strip 1200 of cold-worked material (see FIG. 38), the strip 1200 has the lateral portions 1131, 1132 and the profiles thereof already formed thereon. It is therefore not necessary to perform further bending or manipulation of the upper and lower plate portions 1030, 1032 to provide the profiles of the lateral portions 1131, 1132 and 1131A,1132A since the upper and lower plate portions 1030, 1032 already have the outer lateral portions 1131, 1132 and 1131A, 1132A once the fastener body 1024 has been separated from the elongate strip 1200.

At the lateral sides 1120, 1120A (see FIGS. 27 and 28), the upper and lower plate portions 1030, 1032 have walls 1044, 1044A that protect the bight 1072 and the ends 1080, 1082 of the outer staple 1070A. At the opposite lateral sides 1122, 1122A, the plate sections 1053, 1053A of the upper and lower plate portions 1030, 1032 include ledge portions 1130, 1130A with the apertures 1069, 1071 and 1069A, 1071A formed therein. Because the ledge portions 1130, 1130A have a shorter vertical height than the walls 1044, 1044A, the ledge portions 1130, 1130A provide a clearance 1133 (see FIG. 31) to permit the walls 1044, 1044A of a nearby fastener 1010 to tilt into the clearance 1133. This cooperation between the lateral sides 1120, 1122 and 1120A, 1122A of nearby fasteners permits a high angle of articulation between the nearby fasteners 1010 without the lateral sides 1120, 1122 and 1120A, 122A abutting and restricting movement of the fasteners 1010.

With reference to FIGS. 27, 28, and 33, the outer staple 1070B has legs 1074, 1076 for extending through the apertures 1069, 1071 in the ledge portion 1130 of the upper plate portion 1030 and apertures 1069A, 1071A in the ledge portion 1130A of the lower plate portion 1032. Whereas the walls 1044, 1044A protect the bight 1072 and leg ends 1080, 1082 of the outer staple 1070A, the bight 1072 and leg ends 1080, 1082 of the outer staple 1070B are laterally exposed at the lateral sides 1122, 1122A. However, with reference to FIG. 33, with the fasteners 1010A, 1010B secured to the conveyor belt end 1012, 1014, the outer wall 1044 of the fastener 1010B laterally protects the bight 1072 of the staple 1070B on the upper ledge portion 1130 of the fastener 1010A and the outer wall 1044A (see FIG. 28) of the fastener 1010B laterally protects the leg ends 1080, 1082 of the outer staple 1070B on the lower ledge portion 1130A of the fastener 1010A. Thus, the fasteners 1010A, 1010B cooperate to permit relative movement therebetween with troughing of the conveyor belt 1016 while continuing to protect the outer staple 1070B of the fastener 1010A.

Figure 32:
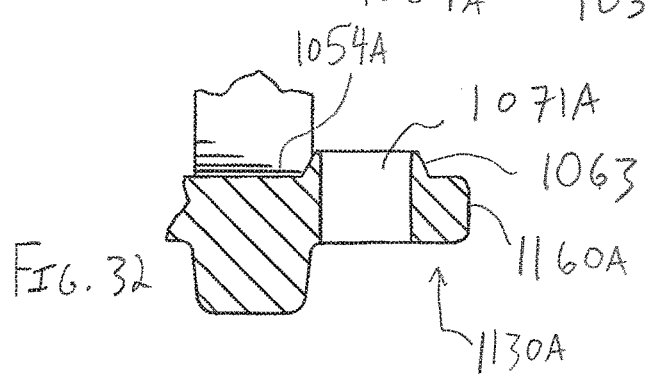
FIG. 32 is a cross-sectional view taken across line 32-32 in FIG. 22 showing an aperture in the lower plate portion sized to receive a leg of one of the staples and a collar of the lower plate portion extending about the aperture.

With reference to FIG. 30, the outer lateral portion 1131 includes a vertical surface 1140 having an inclined portion 1142 that tapers laterally inward at an angle 1144. The angle 1144 may be in the range of approximately two degrees to approximately fifteen degrees, such as approximately six degrees. Because the inclined portion 1142 tapers laterally inward, the inclined portion 1142 provides clearance 1145 for movement of the vertical surface 1140 relative to a nearby fastener 1010 (see FIG. 33). With reference to FIG. 31, the outer lateral portion 1132 may have a vertical surface 1160 with a different contour than the vertical surface 1140 of the outer lateral portion 1131. For example, the vertical surface 1160 may have a generally straight portion 1162 extending substantially orthogonal to the inner surface 1054 of the upper plate portion 1030 (see FIG. 24). Because the surface 1160 is substantially orthogonal to the lower surface 1054, the surface 1160 permits the ledge portion 1130 and staple bight 1072 thereon to be placed closely to the wall 1044 of a nearby upper plate portion 1030 to maximize the protection for the staple bight 1072. Similarly, the surface 1160A (see FIG. 32) of the ledge portion 1130A of the lower plate portion 1032 is substantially orthogonal to the inner surface 1054A and permits the ledge portion 1131A and the staple leg ends 1080, 1082 thereon to be placed closely to the wall 1044A of a nearby lower plate portion 1032 to maximize the protection for the staple legs ends 1080, 1082. With reference to FIGS. 31 and 32, the vertical surfaces 1160, 1160A include chamfered corners 1164, 1166 to provide clearance for articulation of the outer walls 1044, 1044A of a nearby fastener 1010.

The outer lateral portions 1131, 1132 and 1131A, 1132A may have different contours than those shown in FIGS. 27 and 28. For example, the outer lateral portions 1131, 1132 may both have a convex contour to permit the lateral portions 1131, 1132 of adjacent upper plate portions 1030 to roll against each other as the conveyor belt 1012 troughs. As another example, one of the lateral portions 1131, 1132 may have a concave contour and the other lateral portion may have a mating convex contour to provide a more controlled pivoting movement of the adjacent upper plate portions 1030 of the associated fasteners 1010.

As discussed above, the body 1024 of the fastener 1010 may be formed from a single, elongate strip 1200 (see FIG. 38) of cold-worked stock material, such as cold-rolled or cold-drawn steel. The strip 1200 has a uniform cross-section throughout the length 1202 of the strip 1200 that includes features of the upper and lower plate portions 1030, 1032. Specifically, the cross-section of the strip 1200 includes raised walls 1044, 1046, 1048 extending from the outer surface 1050 of the strip 1200 and the ribs 1056, 1058, 1060 extending from the inner surface 1054 of the strip 1200. Because the walls 1044, 1046, 1048 and ribs 1056, 1058, 1060 extend for the length 1202 of the strip 1200, the body 1024 also has the walls 1044, 1046, 1048 and ribs 1056, 1058, 1060 extending the length 1170 (see FIG. 34) of the body 1024 except at windows 1210 (see FIG. 34) where the ribs 1056, 1058, 1060 are interrupted along the body 1024. Thus, the walls 1044, 1046, 1048 and ribs 1056, 1058, 1060 are already present in the upper and lower plate portion 1030, 1032 when the plate portions 1030, 1032 are still part of the strip 1200 rather than requiring a separate forming operation on the upper and lower plate portions 1030, 1032.

The cross-section of the strip 1200 may be formed in the strip 1200 by cold-rolling or cold-drawing the strip 1200. For example, the strip 1200 may start off as wire having a circular cross section. The wire is advanced through a series of rollers to form a strip of material having a rectangular cross-section. The strip of material may be cold-rolled to form the raised walls 1044, 1046, 1048 and the ribs 1056, 1058, 1060 into the strip 1200. In addition to forming the desired cross-section into the strip 1200, the cold-rolling process significantly hardens the steel due to the cold working of the material. Thus, the loop portions 1020 and upper and lower plate portions 1030, 1032 of the body 1024 are already very hard when the body 1024 is still a part of the strip 1200 due to the cold rolling of the strip 1200 to form the desired cross-section thereof. The loop portions 1020 and upper and lower portions 1030, 1032 do not need to be further processed in order to increase their strength, in contrast to some prior fastener manufacturing techniques.

The length 1202 of the strip 1200 may initially be many multiples of the length 1170 (see FIG. 34) of the body 1024 and may be stored on, for example, a large spool. A portion of the strip 1200 may be advanced from the spool and run longitudinally through processing equipment to form a sequence of fastener bodies 1024 from the strip 1200 as discussed in greater detail below. Because the elongate strip 1200 has the desired cross-sectional configuration already formed therein, a manufacturing facility for producing the fastener 1010 does not need to include machinery to perform separate manufacturing steps to build up the thickness of the loop portions 1020 and upper and lower plate portions 1030, 1032 as required in some prior fastener manufacturing processes.

With reference to FIG. 34, a top plan view of the fastener body 1024 is shown once the fastener body 1024 has been formed from the elongate strip 1200. Although almost all of the features of the fastener body 1024 have been formed therein, the loop portions 1020 of the fastener body 1024 have not yet been bent such that the body 1024 is still substantially flat like the elongate strip 1200. Additionally, the staples 1070 have not been preset in the upper plate portion 1030 and the wire 1019 has not yet been welded to the inner surface 1054A of the lower plate portion 1032. From FIG. 34, it can be seen that the raised walls 1044, 1046, 1048 of the upper plate portion 1034 are aligned with the loop portions 1020A, 1020B, 1020C connecting the upper and lower plate portions 1030, 1032 and are further aligned with the walls 1044A, 1046A, 1048A of the lower plate portion 1032. Because the fastener body 1024 is formed from the strip 1200 having a uniform cross-section throughout its length 1202, the walls 1044, 1046, 1048, loop portions 1020A, 1020B, 1020C, and walls 1044A, 1046A, 1048A are continuous throughout the length 1170 of the fastener body 1024. Once the loop portions 1020 have been bent, the aligned walls 1044, 1046, 1048, 1044A, 1046A, 1048A and loop portions 1020A, 1020B, 1020C provide the substantially constant thickness 1041 (see FIG. 25) throughout the fastener body 1024 from an outboard end portion 1090 of the upper plate portion to an outboard end portion 1090A of the lower plate portion 1032.

With reference to FIG. 34, the reduced thickness plate sections 1051, 1051A, 1052, 1052A, and 1053, 1053A are spaced apart from each other along the length 1170 of the fastener body 1024 by the windows 1210 formed in the body 1024. The windows 1210 include windows 1210A, 1210B, 1210C formed in the thinner plate sections 1051, 1052, 1053 (see FIG. 38) of the strip 1200 leaving the thicker walls 1044, 1046, 1048 in the strip 1200 to define the loop portions 1020A, 1020B, 1020C of the fastener body 1024. By removing material from the thinner plate sections 1051, 1052, 1053 of the strip 1200 to leave the loop portions 1020A, 1020B, 1020C, the windows 1210A, 1210B, 1210C provide clearance for loop portions 1020 of a fastener 1010 connected to the opposite conveyor belt end 1012, 1014. In other forms of the fastener 1010, the fastener body 1024 may not have windows 1210 formed therein. For example, the fastener 1010 may be a single staple fastener with a fastener body 1024 with an uninterrupted reduced thickness web portion extending between a pair of beam portions from one outboard end of the fastener body to another. In yet another approach, the fastener body may be deformed laterally inwardly at the loop portions to narrow the width of the fastener body at the loop portions to provide clearance for loop portions of adjacent fasteners without removing material from the fastener body.

With reference to FIG. 35, a plan view of the fastener body 24 is provided that is similar to FIG. 34 except that FIG. 35 is a bottom plan view and FIG. 34 is a top plan view. The ribs 1056, 1058, 1060 extend inwardly from the inner surface 1054 of the upper plate portion 1030 and the ribs 1056A, 1058A, 1060A extend inwardly from the inner surface 1054A of the lower plate portion 1032. The ribs 1056, 1058, 1060, 1056A, 1058A, 1060A bite into the conveyor belt end 1012, 1014 once the loop portions 1020 have been bent and the upper and lower plate portions 1030, 1032 are clamped to the conveyor belt section 1012, 1014. The bite of the ribs 1056, 1058, 1060, 1056A, 1058A, 1060A enhances the grip of the upper and lower plate portions 1030, 1032 on the conveyor belt end 1012, 1014.

As shown in FIG. 35, the ribs 1056, 1058, 1060, 1056A, 1058A, 1060A are longitudinally aligned with the apertures 1069, 1071 and 1069A, 1071A and are laterally offset from the loop portions 1020A, 1020B, 1020C. By aligning the ribs 1056, 1058, 1060, 1056A, 1058A, 1060A with the apertures 1069, 1071, 1069A, 1071A, the ribs 1056, 1058, 1060, 1056A, 1058A, 1060A provide additional material surrounding the apertures 1069, 1071, 1069A, 1071A and increase the strength of the connection between the upper and lower plate portions 1030, 1032 and the staple legs 1074, 1076. By positioning the ribs 1056, 1058, 1060 laterally from the loop portions 1020, the resistance to bending of the loop portions 1020 during manufacture may be reduced because the ribs 1056, 1058, 1060 extending between the upper and lower plate portions 1030, 1032 are removed when forming the windows 1210A, 1210B, 1210C.

Figure 38:
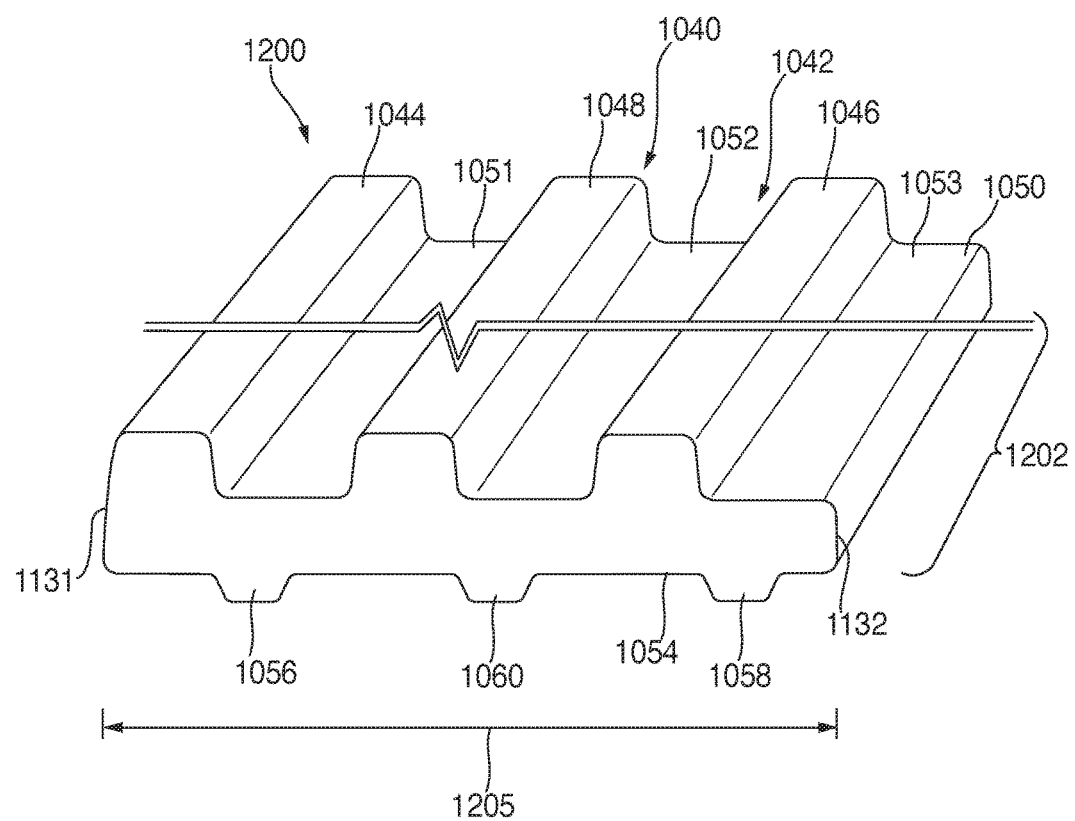
FIG. 38 is a perspective view of a strip of material from which the fastener body of FIGS. 34 and 35 is manufactured showing the laterally offset, outer walls and inner ribs already formed in the strip of material.
Figure 39:
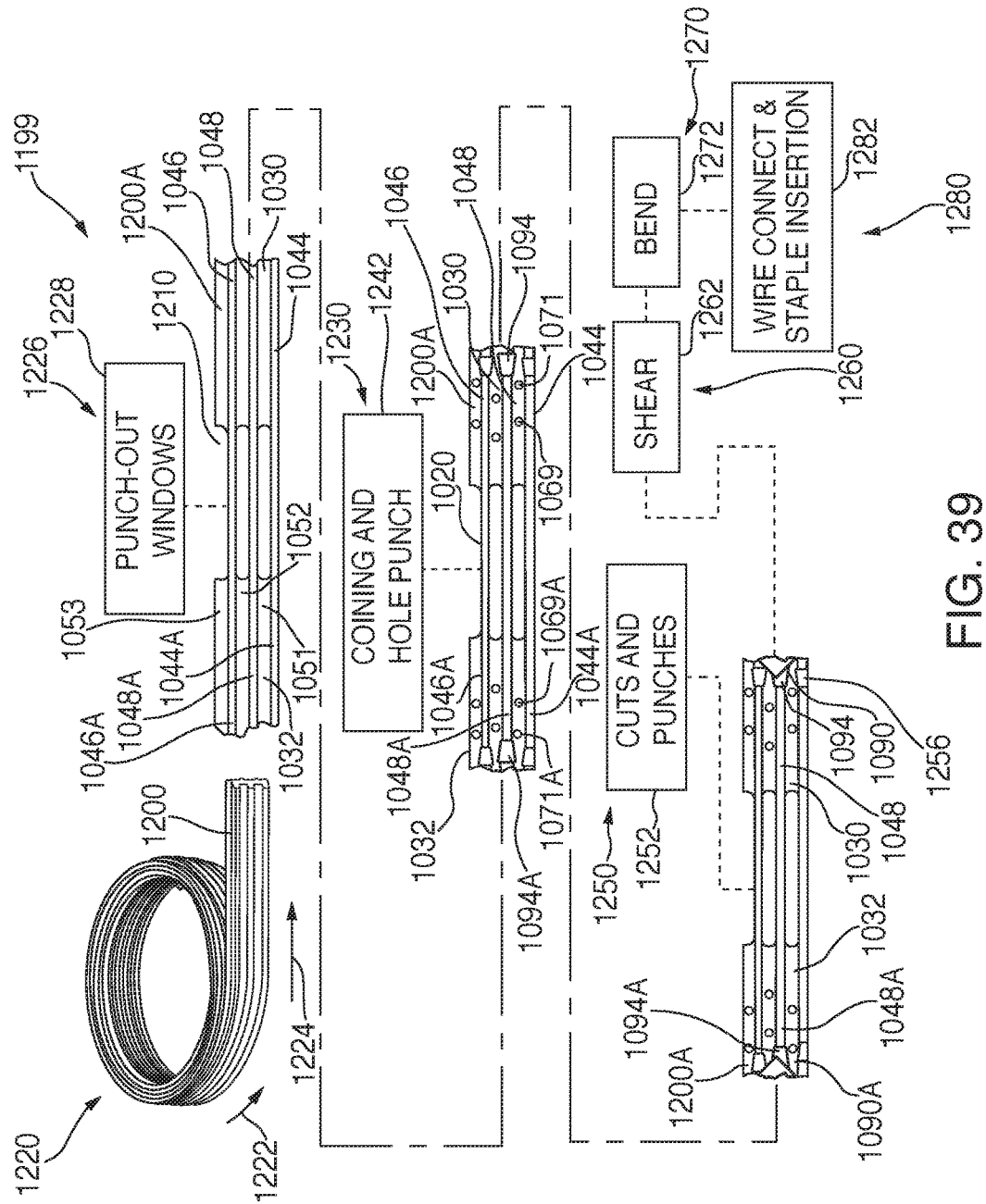
FIG. 39 is a schematic representation of a method of forming the set of fasteners of FIG. 22.

With reference to FIGS. 38 and 39, a method 1199 of manufacturing the fastener 1010 is provided that includes advancing the strip 1200 longitudinally through processing equipment to form the fastener 1010. Initially, the strip 1200 is provided having the length 1202 that may be greater than the length of the fastener body 1024. The strip 1200 may have a number of sections along its length 1202 from which the bodies 1024 of fasteners 1010 will be sequentially produced using the method 1199. The following discussion follows one strip section 1200A as it travels through operations 1226, 1230, 1250, 1260, 1270, and 1280 of the method 1199.

In one approach, the strip 1200 is provided from a coil 1220 rotated in direction 1222 to pay out the strip 1200 in a longitudinal direction 1224. The coil material 1220 may be cold-rolled or cold-drawn steel with the walls 1044, 1046, 1048 and ribs 1056, 1058, 1060 already formed therein as shown in FIG. 38. With the strip 1200 provided on the coil 1220, the strip 1200 has a width 1205 in the range of approximately 0.8 inches to approximately 0.9 inches, such as 0.84 inches and a length 1202 of, for example, greater than ten feet, greater than fifty feet, or greater than one-hundred feet. The length of the strip 1200 therefore may have a length 1202 much greater than the length 1170 of the fastener body 1024, the length 1170 being in the range of approximately three inches to approximately seven inches, such as approximately five inches.

The strip 1200 is advanced in longitudinal direction 1224 until the strip section 1200A reaches a stamping operation 1226. At the stamping operation 1226, the windows 1210 are formed in the strip section 1200A such as by punching out 1228 the windows 1210. Because the strip 1200 includes the walls 1044, 1048, 1046 and ribs 1056, 1058, 1060, these features are already present in the strip section 1200A upon reaching the punch-out operation 1228. The windows 1210 are formed in the strip section 1200A by punching out 1228 portions of the reduced thickness sections 1051, 1052, 1053 (see FIG. 38) of the strip section 1200A and leaving the walls 1044, 1046, 1048 extending along the strip section 1200A. With the windows 1210 formed in the strip section 1200A, the windows 1210 generally separate upper and lower plate portions 1030, 1032 of the strip section 1200A. The stamping operation 1226 may be performed using a hydraulically operated press having a punch and a die. In other approaches, the windows 1210 may be formed using, for example, a laser cutting or electrical discharge machining.

Next, the strip section 1200A is advanced in longitudinal direction 1224 to a stamping operation 1230 that includes a coining and hole punch operation 1242. At the coining and hole punch operation 1242, a punch is used to strike the walls 1044, 1046, 1048 of the upper plate portion 1030 and the walls 1044A, 1046A, 1048A of the lower plate portion 1032 to form the tapered leading surfaces 1094, 1094A thereon (see FIG. 34).

The coining and hole punch operation 1242 also includes using punches to form the three pairs of apertures 1069, 1071 in the upper plate portion 1030 of the strip section 1200A and the three pairs of apertures 1069A, 1071A in the lower plate portion 1032 of the strip section 1200A. While forming the apertures 1069, 1071 and 1069A, 1071A, the punches extrude material of the upper and lower plate portions 1030, 1032 toward dies supporting the inner surfaces 1054, 1054A of the upper and lower plate portions 1030, 1032. This extruded material forms a raised collar 1063 (see FIGS. 29 and 32) around each of the apertures 1069, 1071, 1069A, 1071A on the inner surfaces 1054, 1054A. The raised collar 1063 provides additional strength to the connection between the upper and lower plate portions 1030, 1032 and the staple legs 1074, 1076 as discussed above with respect to the engagement region 448 in FIG. 16 discussed above.

The strip section 1200A is advanced in longitudinal direction 1224 to a stamping operation 1250 that includes using cuts and punches 1252 for finishing the outboard end portions 1090, 1090A of the strip section 1200A. The cuts and punches operation 1252 includes using one or more punches to form the generally V-shaped cutouts 1092, 1092A (see FIG. 35) in the outboard end portions 1090, 1090A of the strip section 1200A.

As shown in FIG. 39, the operation of forming the V-shaped cutouts 1092, 1092A in the strip 1200 involves removing material from the middle walls 1048, 1048A of the upper and lower plate portions 1030, 1032. Due to this removal of material, a portion of the coined leading surfaces 1094, 1094A previously formed at the operation 1242 may be removed. The operation 1252 may include performing additional coining of the middle walls 1048, 1048A at the outboard edges 1090, 1090A to re-form the coined leading surfaces 1094, 1094A on the walls 1048, 1048A.

Next, the strip section 1200A is longitudinally advanced in direction 1224 to a separation operation 1260 that removes the strip portion 1200A from the strip 1200. Because previous operations 1226, 1230, 1250 have formed the features in the strip portion 1200A, separating 1260 the strip portion 1200A from the strip 1200 produces the fastener body 1024 shown in FIGS. 34 and 35 that may be used to assemble the fastener 1010. In one form, the separation operation 1260 includes shearing 1262 the strip 1200 across its width to separate the upper and lower plate portions 1030, 1032 of adjoining strip sections. The shearing process 1262 consecutively separates strip sections from the longitudinally advancing strip 1200. The resulting fastener bodies 1024 may be collected and transported (either sequentially or after accumulating multiple bodies 1024) to a loop portion forming operation 1270.

The fastener bodies 1024 enter the loop portion forming operation 1270 in the flat configuration shown in FIGS. 34 and 35 after the bodies 1024 have been cut from the strip 1200. At the loop portion forming operation 1270, the loop portions 1020 of the fastener bodies 1024 are bent 1272 to a desired curvature. The loop portions 1020 of each fastener body 1024 are bent 1272 until the upper and lower plate portions 1030, 1032 are in a desired vertical spaced relationship with a gap 1290 between the upper and lower plate portions 1030, 1032, as shown in FIG. 22. In this open configuration, the fastener body 1024 is ready to receive a conveyor belt end 1012, 1014 between the upper and lower plate portions 1030, 1032.

The fastener body 1024 is then advanced to an assembly operation 1280 for assembling the fastener bodies 1010 together into the strip 1017 and securing the staples 1070 thereto. For example, the assembly operation 1280 may include a wire connect and staple insertion operation 1282 that includes welding or otherwise securing the wire 1019 to the inner surfaces 1054A of the lower plate portions 1032 of the fastener bodies 1024, as shown in FIG. 22. The operation 1282 may also include inserting the legs 1074, 1076 of the staples 1070 into the apertures 1069, 1071 of the upper plate portions 1030. The legs 1074, 1076 are press-fit into the apertures 1069, 1071 which keeps the staples 1070 secure on the upper plate portions 1030 during transport and assembly of the fastener set 1017 onto the conveyor belt end 1012, 1014.

In one form, the processing equipment for performing the method 1199 includes one or more hydraulic presses with punches and dies configured to perform the operations 1226, 1230, 1250, 1260, 1270 on the strip section 1200A. Whether one press or a plurality of presses are used, the tonnage of each press may each be less than one hundred and fifty tons, or even less than one hundred tons. This tonnage is less than conventional fastener manufacturing processes where presses of over two hundred tons are required to build up or change the cross section of the loops of the fasteners to make the loops of these conventional fasteners more rigid. The method 1199 can thereby utilize smaller presses because the loop portions 1020 of the fastener body 1024 are formed by removing material from the reduced thickness plate sections 1051, 1052, 1053 rather than building up or changing the cross section of the loops 1020, which is often the highest tonnage operation in conventional fastener manufacturing processes. The smaller tonnage presses that can be used with the method 1199 avoid the cost of operating the heavier presses of conventional fastener manufacturing processes as well as the cost and maintenance of the heavier presses.

Although the methods described above are generally presented in sequential order, it will be appreciated that the operations may be modified, combined, removed, or performed in a different order than the order presented. Further, additional or fewer actions may be performed at each operation without departing from the teachings of this disclosure. For example, although punches are described above for removing material from the strip sections 183A and 1200A other approaches including laser, drilling, and/or electrical discharge machining may be used to remove material. Further, although coining operations are discussed above these operations may be replaced with other techniques. For example, the leading or outboard surfaces 275, 275A may be cut with blades into the respective fastener body 2.

Figure 40:
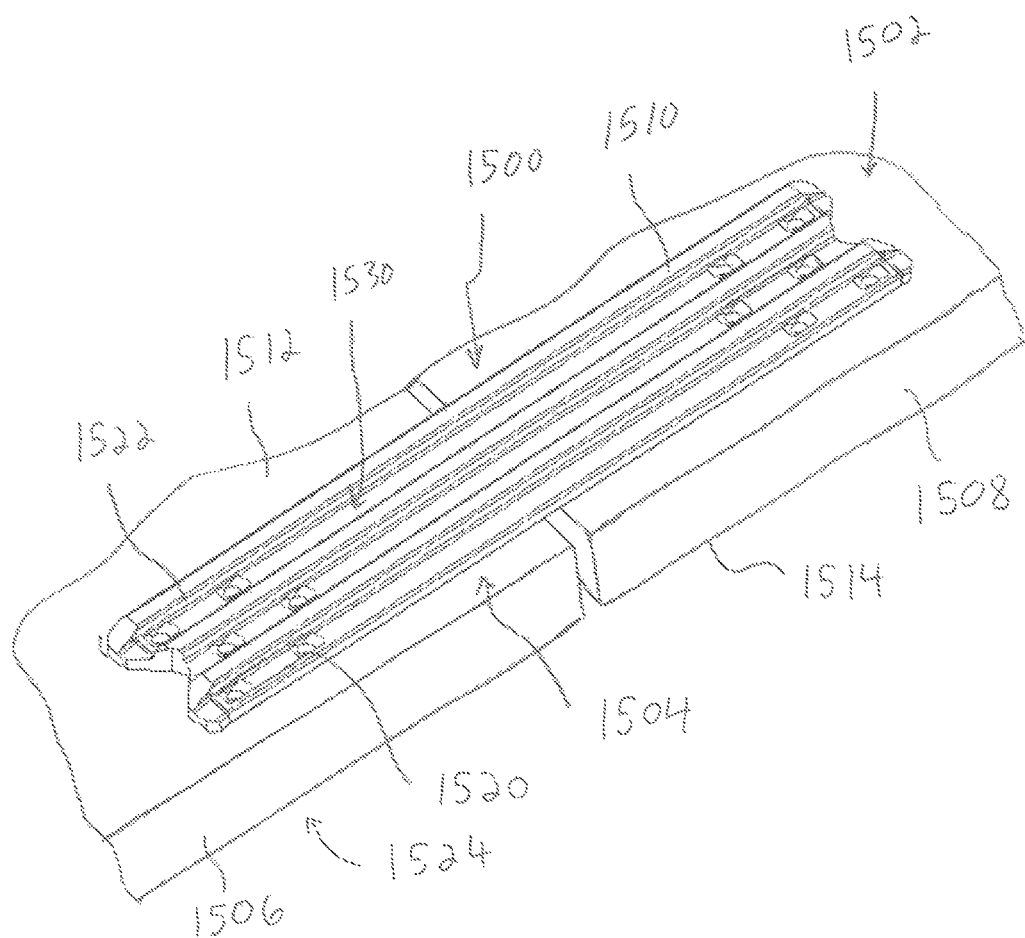
FIG. 40 is a perspective view of a conveyor belt splice including a fastener having a rigid fastener body joining ends of the conveyor belt with staples of the fastener removed to show apertures of the fastener body above the ends of the conveyor belt.

With reference to FIG. 40, another splice 1500 for a conveyor belt 1502 is provided that utilizes a fastener 1504 to join ends 1506, 1508 of the conveyor belt 1502. The fastener 1504 includes a pair of identical fastener bodies 1510 with one fastener body 1510 disposed on outer surfaces 1512 and the other fastener body 1510 disposed on inner surfaces 1514 of the conveyor belt ends 1506, 1508. The inner surfaces 1514 of the conveyor belt 1502 face the rollers and pulleys (see pulley 350 in FIG. 12) during operation of the conveyor belt and the outer surfaces 1512 face away from the rollers and pulleys. The outer surfaces 1512 may be engaged by a conveyor belt scraper. In one form, the conveyor belt 1502 has a top run for carrying conveyed material in a first direction and a return run that travels in an opposite, second direction after traveling around a head pulley. The outer surface 1512 of the top run of the conveyor belt 1502 is an upper surface of the top run and the inner surface 1512 of the top run is a lower surface of the top run. Conversely, the outer surface 1512 of the return run of the conveyor belt 1502 is a lower surface of the return run and the inner surface 1512 of the return run is an upper surface of the return run.

The fastener bodies 1510 are similar to the fastener body 320 shown in FIGS. 19 and 20, except that the fastener bodies 1510 do not include windows 311A, 311B, 311C or loop portions 308A, 308B, 308C. Because the fastener bodies 1510 are disposed above and below each conveyor belt end 1506, 1508, the fastener 1504 includes an upper plate portion 1522 (of the fastener body 1510 on the outer surface 1512) and a lower plate portion 1524 (of the fastener body 1510 on the inner surface 1514) that clamp the conveyor belt end 1506, 1508 therebetween. The upper and lower plate portions 1522, 1524 are secured to the conveyor belt ends 1506, 1508 by staples having legs advanced through aligned apertures 1520 in the upper and lower fastener bodies 1520. The staple bights seat in channels 1530 of the upper fastener body 1510 and the staple legs are bent against the lower fastener body 1510 in channels 1530 thereof. The fastener 1504 may be particularly advantageous in conveyor belt applications utilizing a large diameter head pulley and idlers where the splice 1500 does not need to provide a hinge motion to permit the conveyor belt 1502 to travel around the head pulley and idlers.

Figure 41:
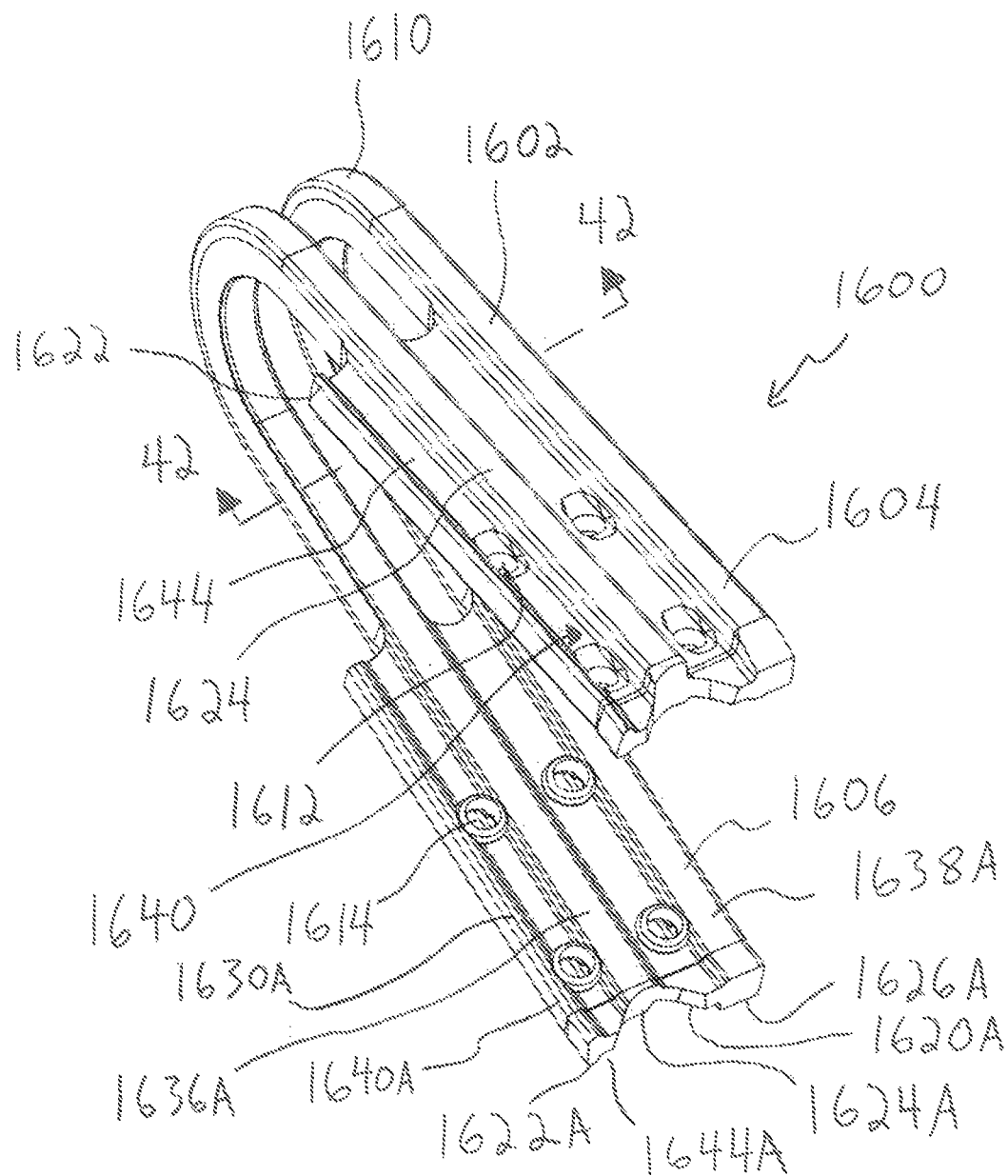
FIG. 41 is a perspective view of another fastener showing upper and lower plate portions of the fastener interconnected by a pair of arcuate hinge loop portions.
Figure 42:
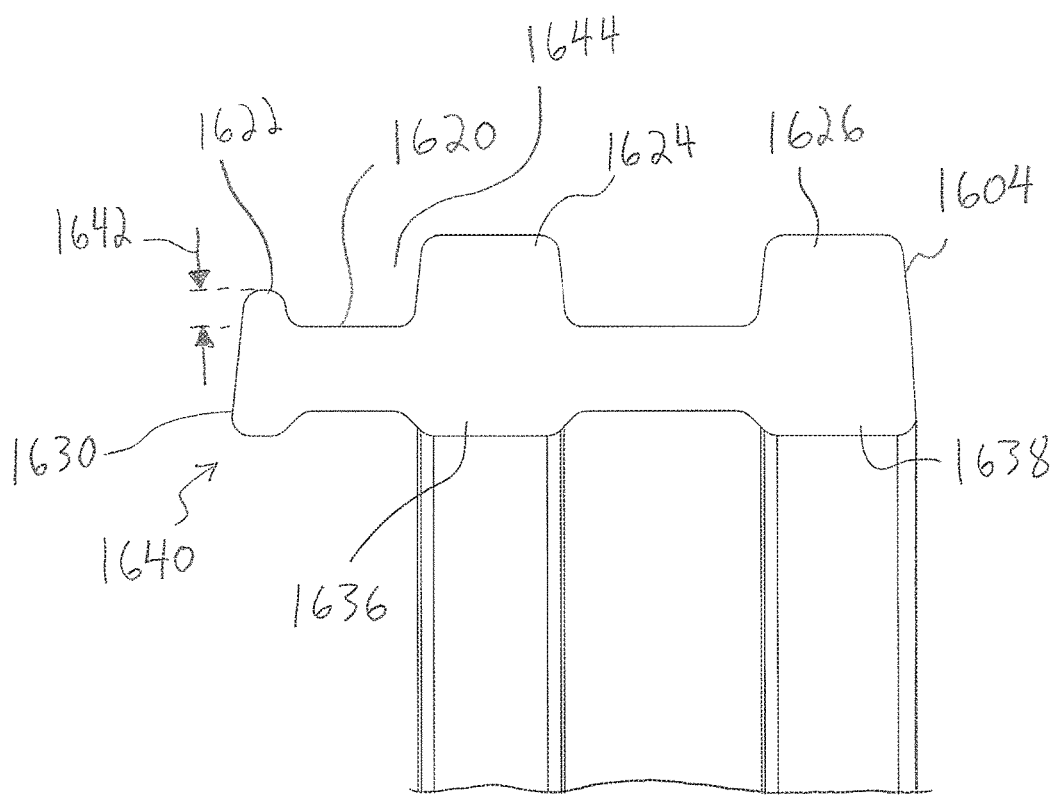
FIG. 42 is a cross-sectional view taken across line 42-42 in FIG. 41 showing a smaller, raised lip or wall at one lateral side of the upper plate portion for protecting a staple bight seated next to the wall.

With reference to FIGS. 41 and 42, another fastener 1600 is provided that is similar in many respects to the fastener 1 discussed above. The fastener 1600 has a body 1602 with upper and lower plate portions 1604, 1606 connected by arcuate hinge loop portions 1610. The upper and lower plate portions 1604, 1606 include ledge portions 1640, 1640A with raised or upstanding outer walls 1622, 1622A that provide additional material on the outer lateral sides of the upper and lower plate portions 1604, 1606 so that the outer lateral sides are thickened or enlarged over the remainder of the adjacent ledge portion. This additional material increases the strength and rigidity of the ledge portions 1640, 1640A and improves their ability to resisting bending during operation of the conveyor belt.

The fastener 1600 includes two staples (not shown) having legs that are press fit into apertures 1612 of the upper plate portion 1604. The staple legs may be driven through a conveyor belt, into apertures 1614 of the lower plate portion 1606, and bent over against the lower plate portion 1606. With reference to FIG. 42, the upper plate portion 1604 includes an outer surface 1620 with walls 1622, 1624, 1626 extending outwardly from the outer surface 1620. The upper plate portion 1604 has inner ribs 1630, 1636, 1638 aligned with the walls 1622, 1624, 1626. Like the upper plate portion 1604, the lower plate portion 1606 has an outer surface 1620A with walls 1622A, 1624A, 1626A extending outwardly therefrom and inner ribs 1630A, 1636A, 1638A aligned with the walls 1622A, 1624A, 1626A.

The walls 1622, 1622A each extend outward to have a height 1642 as measured from the outer surfaces 1620, 1620A of the upper and lower plate portions 1604, 1606. The height 1642 may be less than the heights of the walls 1626, 1626A of an adjacent fastener 1600 to provide clearance for pivoting of the adjacent fastener as the conveyor belt troughs, for example as shown in FIG. 33. At the upper plate portion 1604, the wall 1622 and the wall 1624 form a pocket 1644 that receives the bight of the staple. At the lower plate portion 1606, the wall 1622A and the wall 1624A form a pocket 1644A that receives the legs of the staple. The legs of the staple are bent into the channel 1644A after the staple legs have been driven through the conveyor belt and into the apertures 1614 of the lower plate portion 1606.

The walls 1622, 1622A may operate with the walls 1624, 1624A to provide further protection to the bight and the legs of the staple associated with the ledge portion 1644, 1644A. The walls 1622, 1622A may provide further protection for the bight and the legs of the staple regardless of whether the upper plate portion 1604 or the lower plate portion 1606 is mounted on an outer surface of the conveyor belt end. Because either the upper plate portion 1604 or the lower plate portion 1606 may be mounted on the outer surface of the conveyor belt end, the fastener 1600 provides additional flexibility during installation of the fastener 1600 on the conveyor belt end.

For example, if the fastener 1600 may be installed on a conveyor belt end in a standard orientation with the upper plate portion 1604 mounted on the outer surface of the conveyor belt end. In this standard orientation, the bight of the staple received on the ledge portion 1644 will be presented to a conveyor belt scraper scraping the belt and the walls 1622, 1624 may absorb impacts and abrasion from the belt scraper rather than the staple bight. With the fastener 1600 installed in the standard orientation, the lower plate portion 1606 will be mounted on an inner surface of the conveyor belt. The inner surface of the conveyor belt may be supported by steel rollers such that the lower plate 1606 and staple legs on the ledge portion 1644A will be presented to the steel rollers. The walls 1622A and 1624A may absorb impacts and abrasion from these steel rollers rather than the staple legs on the ledge portion 1644A.

The fastener 1600 may be installed on the conveyor belt end in an inverted orientation where the lower plate portion 1606 is mounted on the outer surface of the conveyor belt end and the upper plate portion 1604 is mounted on the inner surface of the conveyor belt end. In this inverted orientation, the walls 1622A, 1624A protect the ends of the staple legs on the ledge portion 1644A from impacts and abrasion due to contact with the conveyor belt scraper that scrapes the outer surface of the conveyor belt. The walls 1622, 1624 protect the staple bight on the ledge portion 1644 from impacts and abrasion due to contact with the steel rollers supporting the inner surface of the conveyor belt. The walls 1622, 1622A thereby provide further protection for the staple associated with the ledge portions 1640, 1640A whether the fastener 1600 is secured to a conveyor belt in a standard or an inverted orientation. It will be appreciated that the other fasteners discussed above could be secured to a conveyor belt end in either a standard orientation or an inverted orientation.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A conveyor belt fastener for splicing ends of a conveyor belt together, the conveyor belt fastener comprising:
    upper and lower plate portions each having an outer surface for facing away from a conveyor belt and an inner surface for engaging the conveyor belt, the upper and lower plate portions each having an inboard edge and an outboard edge and a longitudinal length extending therebetween;
    at least one aperture of each of the upper and lower plate portions sized to receive an attachment member for connecting the upper and lower plate portions to the conveyor belt;
    at least one loop connecting the upper and lower plate portions and laterally offset from the apertures of the upper and lower plate portions; and
    the upper and lower plate portions each having a cross-section taken laterally thereacross that has a varying thickness between the outer and inner surfaces, the cross-section being substantially uniform along the length of the upper and lower plate portions.

2. The conveyor belt fastener of claim 1 wherein the cross-section of each of the upper and lower plate portions is uniform along the length of the plate portion except at the at least one aperture and at the outboard edge thereof.

3. The conveyor belt fastener of claim 2 wherein the outer surface of each of the upper and lower plate portions includes a raised wall extending longitudinally intermediate the inboard and outboard edges along one side of the at least one aperture for protecting the attachment member received therein.

4. The conveyor belt fastener of claim 3 wherein the outer surface of each of the upper and lower plate portions includes a second raised wall extending longitudinally intermediate the inboard and outboard edges on an opposite side of the at least one aperture from the other raised wall.

5. The conveyor belt fastener of claim 2 wherein the cross-section of each of the upper and lower plate portions has a polygonal shape.

6. The conveyor belt fastener of claim 2 wherein the upper and lower plate portions each include a thicker portion between the inner and outer surfaces thereof extending longitudinally intermediate the inboard and outboard edges and a thinner portion between the inner and outer surfaces and extending laterally from the thicker portion; and the at least one aperture of the upper and lower plate portions being in the thinner portion thereof.

7. The conveyor belt fastener of claim 2 wherein the outer surface of each of the upper and lower plate portions includes a pair of raised walls forming a crenulated portion of the cross-section of the upper and lower plate portions.

8. The conveyor belt fastener of claim 2 wherein the upper and lower plate portions each include a first channel extending longitudinally intermediate the inboard and outboard edge; and the at least one aperture of each upper and lower plate portion extends through the plate portion at the channel.

9. The conveyor belt fastener of claim 2 wherein the upper and lower plate portions each include a pair of channels extending from the inboard edge to the outboard edge.

10. The conveyor belt fastener of claim 2 wherein the at least one loop includes a pair of loops spaced apart from each other.

11. The conveyor belt fastener of claim 2 wherein the upper and lower plate portions each include at least one raised outer wall and at least one raised inner rib.

12. The conveyor belt fastener of claim 2 wherein the upper and lower plate portions each include a laterally outer ledge having an inner surface for facing the conveyor belt and an outer surface for facing away from the conveyor belt and a laterally outer, vertical surface extending between the inner and outer surfaces of the ledge.

13. The conveyor belt fastener of claim 2 wherein the inboard edge of the upper and lower plate portions each includes at least one concave edge.

14. The conveyor belt fastener of claim 2 wherein the at least one aperture of each of the upper and lower plate portions includes a pair of apertures; and an attachment member having a pair of legs engaged in the apertures of one of the upper and lower plate portions.

15. The conveyor belt fastener of claim 2 wherein the outboard edges are coined to provide a ramped lead-in surface for the plate portions.

16. The conveyor belt fastener of claim 2 wherein the cross-section of each of the upper and lower plate portions is uniform along the length of the plate portion except at the at least one aperture and at the inboard and outboard edges thereof.

17. The conveyor belt fastener of claim 1 wherein the upper and lower plate portions each include a pair of channels extending from the inboard edge to the outboard edge.

18. The conveyor belt fastener of claim 1 wherein the at least one aperture of each of the upper and lower plate portions includes a first aperture laterally offset in a first direction from the at least one loop and a second aperture laterally offset in an opposite, second direction from the at least one loop so that the first and second apertures are at opposite lateral sides of the at least one loop.

19. The conveyor belt fastener of claim 1 wherein the upper and lower plate portions each include at least one raised outer wall and at least one raised inner rib.

20. The conveyor belt fastener of claim 19 wherein the at least one raised outer wall and the at least one raised inner rib of each plate portion are vertically aligned.

* * * * *